US012775555B2

(12) United States Patent
Croxford et al.

(10) Patent No.: US 12,775,555 B2
(45) Date of Patent: Oct. 27, 2026

(54) GRAPHICS PROCESSORS

(71) Applicant: Arm Limited, Cambridge (GB)

(72) Inventors: Daren Croxford, Cambridgeshire (GB); Isidoros Sideris, Cambridgeshire (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/990,724

(22) Filed: Dec. 20, 2024

(65) Prior Publication Data

US 2026/0140880 A1 May 21, 2026

(30) Foreign Application Priority Data

Nov. 21, 2024 (EP) .................................... 24386133

(51) Int. Cl.
*G06F 12/084* (2016.01)

(52) U.S. Cl.
CPC .................................. *G06F 12/084* (2013.01)

(58) Field of Classification Search
CPC .................................................... G06F 12/084
USPC .......................................................... 711/130
See application file for complete search history.

(56) References Cited

U.S. PATENT DOCUMENTS

2019/0102302 A1* 4/2019 Taht .................... G06F 12/0862
2021/0089465 A1* 3/2021 Prabhakar ................. G06T 1/60
2022/0058132 A1* 2/2022 Roberts ............... G06F 12/0864
2022/0276966 A1* 9/2022 Shcherbina ......... G06F 12/0813
2023/0297440 A1* 9/2023 Cowperthwaite ..... G06F 9/5016
718/104
2024/0004767 A1 1/2024 Kerry et al.
2024/0012673 A1 1/2024 Garbett et al.
2025/0291620 A1* 9/2025 Wang .................. G06F 9/45558

* cited by examiner

*Primary Examiner* — Jared I Rutz
*Assistant Examiner* — Wei Ma
(74) *Attorney, Agent, or Firm* — Pearl Cohen LLP

(57) ABSTRACT

Disclosed is a graphics processor that comprises a plurality of processing cores and a cache that is operable to transfer data between the processing cores and a memory that the graphics processor has access to. Access logic is provided to control how memory accesses issued by the processing cores are distributed across the cache slices. The cache slice that is used for a memory access is determined using a function computed by the access logic based on one or more properties associated with the memory access, and the function can be changed over time to vary how memory accesses from the plurality of processing cores are distributed across the plural cache slices.

17 Claims, 18 Drawing Sheets

GRAPHICS PROCESSORS

BACKGROUND

The technology described herein relates to graphics processors (graphics processing units, "GPUs").

It is becoming increasingly common for data processing systems to require processing, e.g., graphics processing operations, for multiple isolated sub-systems. For example, vehicles may have a display screen for the main instrument console, an additional navigation and/or entertainment screen, and an advanced driver assistance system (ADAS).

Each of these systems may require their own processing operations to be performed, and it may be necessary, e.g. for formal safety requirements, for them to be able to operate independently of each other.

To facilitate this, it may be desirable to provide a single graphics processor that can be divided into one or more "partitions", with a respective partition containing a respective group of processing cores and other ancillary processing elements of the graphics processor.

As will be discussed further below, this can then provide a graphics processor for carrying out processing tasks for virtual machines in which the processing elements within the graphics processor can be allocated and organised for use by (different) virtual machines in a flexible and adaptable manner.

Thus, the (same) graphics processor can be used to perform different processing operations by the different partitions, and the partitioning of the graphics processor may be configured to provide appropriate (hardware) isolation between these processing operations. For example, in this way, it is possible to flexibly and adaptably divide the graphics processor into a, e.g. "safety critical" partition and a non-safety critical partition, and for these partitions to be effectively isolated from each other.

The Applicant however believes that there is room for improved graphics processor operation in this regard.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DESCRIPTION

Figure 1:
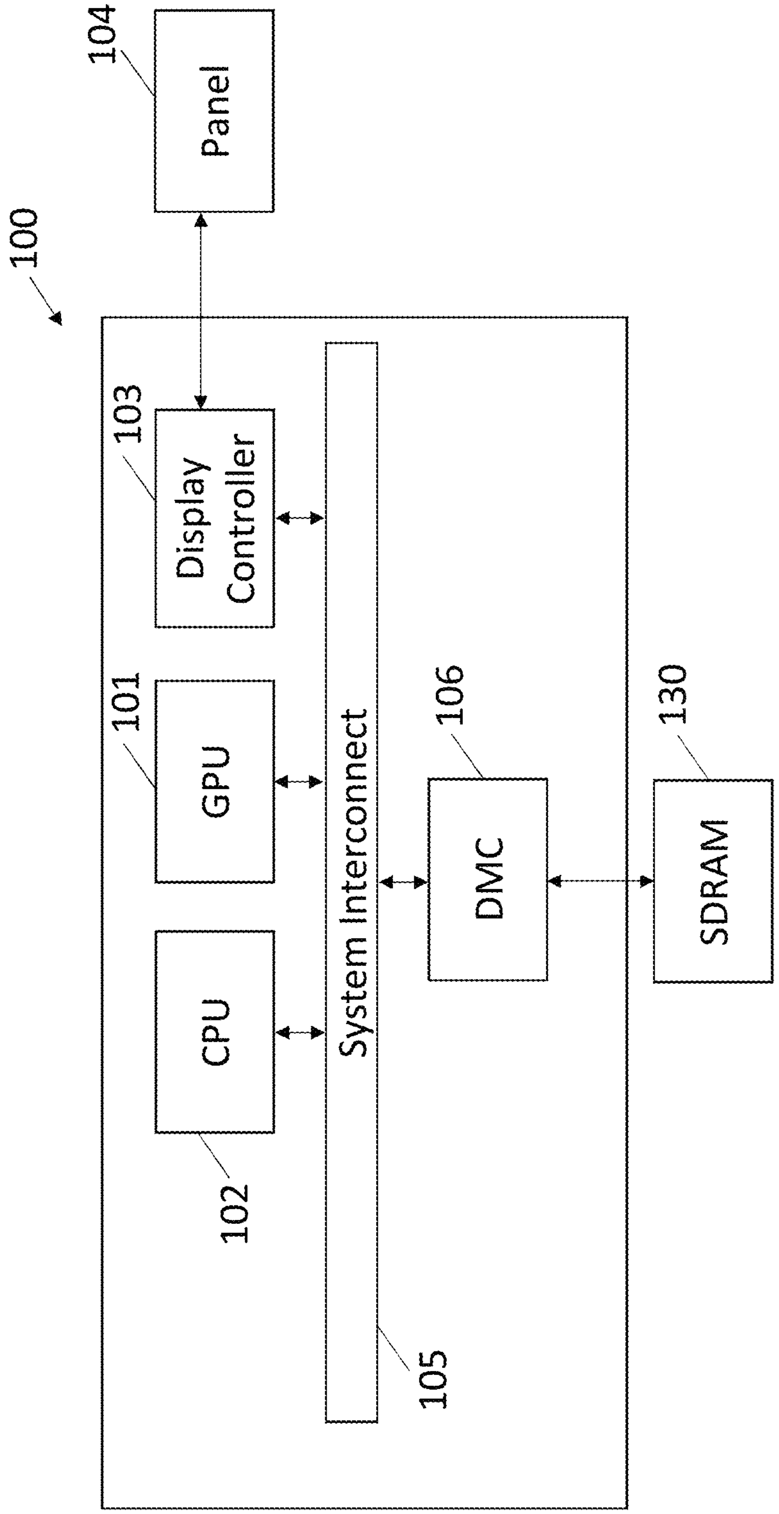
FIG. 1 shows schematically a data processing system according to an embodiment of the technology described herein.

A first embodiment of the technology described herein comprises a graphics processor that comprises:

- a plurality of processing cores;
- a cache that is operable to transfer data between the processing cores and a memory that the graphics processor has access to, the cache arranged as plural cache "slices", each cache slice corresponding to a respective portion of the cache; and
- access logic to control how memory accesses issued by the processing cores are distributed across the cache slices, wherein the cache slice that is used for a memory access is determined using a function computed by the access logic based on one or more properties associated with the memory access, and
- wherein the function that is used by the access logic to determine which cache slice should be used for a memory access is programmable, such that the function can be changed over time to vary how memory accesses from the plurality of processing cores are distributed across the plural cache slices.

A second embodiment of the technology described herein comprises a method of operating a graphics processor that comprises:

- a plurality of processing cores; and
- a cache that is operable to transfer data between the processing cores and a memory that the graphics processor has access to, the cache arranged as plural cache "slices", wherein the cache slice that is used for a memory access is determined using a function computed based on one or more properties associated with the memory access, and
- the method comprising:
- re-programming the function that is used to determine which cache slice should be used for a memory access over time to vary how memory accesses from the plurality of processing cores are distributed across the plural cache slices.

The technology described herein relates to graphics processors (graphics processing units) (GPUs) that include plural processing (e.g. shader) cores and a cache that is effectively shared between the plural processing (shader) cores.

For example, and in embodiments, the cache is a level 2 (L2) cache that is provided locally to, and "on chip" with, the graphics processor, and sits (logically) between the processing cores of the graphics processor that will produce/use the data and a memory in which the data will be stored (although it will be appreciated that multiple levels of caching may be provided, as desired).

According to the technology described herein, the cache is arranged as plural cache "slices" (or portions) that are (at least logically) separate from each other.

Each cache slice thus corresponds to a separate, non-overlapping portion of the cache. In embodiments, each of the plural cache slices has the same size, but this need not be the case.

A particular cache slice (i.e. a portion of the (shared) cache) may thus be allocated to a respective set of one or more processing cores (e.g. to a respective "partition" within the graphics processor, as will be explained further below), and used thereby for transferring data between the processing cores and the memory.

In this respect, it will be appreciated that a data processing system including a graphics processor will typically include a memory (e.g. main memory) that is in embodiments external to the graphics processor but in which data for the processing being performed by the graphics processor will be stored. When a processing core needs to access the memory (e.g. to read data from or write data to the memory), the processing core thus issues a corresponding memory access (request), and this memory access is performed via the cache, e.g., and in embodiments, in the normal manner for graphics processor cache operation.

According to the technology described herein, the particular cache slice that will be used for a given memory access is determined using a function that is computed based on one or more properties associated with the memory access. In embodiments, the function is computed based on (at least part of) the memory address associated with the memory access. However, the function could also take into account other properties associated with the memory access (such as an identifier of which processing core issued the memory access)

For example, and in embodiments, the function is a hash function, and the hash function is in embodiments computed based on (at least part of) the memory address associated with the memory access. Other suitable functions could however be used, including, for example, look up table functions, with the look up table storing desired mappings between properties (e.g. memory addresses) and cache slices.

The graphics processor may thus comprise access logic to control how memory accesses issued by the processing cores are distributed across the cache slices, and this access logic will include circuits to, for any memory accesses that are issued via the access logic, compute the relevant function to thereby determine which cache slice is to be used for the memory access.

This access logic may generally reside at any suitable location within the graphics processor. For example, the computation of the function to determine which cache slice is to be used for the memory access should be performed at a suitable point on the memory access path logically between the processing cores and the cache, and so the access logic should be, and in embodiments is, provided within the graphics processor's memory system, but the access logic may generally reside at any suitable location along the memory access path.

In embodiments, each processing core (that may require memory accesses) includes and/or has associated with it corresponding access logic for controlling how memory accesses issued from that processing core are distributed across the cache slices that are available for that processing core, but other arrangements would be possible. For instance, suitable access logic could be shared by a respective 'bank' of processing cores.

The function that is used (i.e. by the access logic) to determine which cache slice should be used for a memory access can thus be (and is) suitably selected so as to distribute memory traffic between the cache slices in a desired manner.

For example, in some situations, the function may be set to (try to) distribute memory traffic between the cache slices, as that will tend to provide better overall system performance. Thus, memory traffic may be distributed across the plural cache slices by, for example, allocating different memory addresses within the overall address space of the memory to different cache slices.

According to the technology described herein, however, rather than there being a set, e.g. default, function that is (always) used to determine which cache slice should be used for a memory access, the function that is used to determine which cache slice should be used for a memory access is programmable (or 'configurable'), i.e. it can be set differently to cause different determinations of which cache slice should be used for a memory access. The function can hence be programmed, and re-programmed, over time. By re-programming the function that is used to determine which cache slice should be used for a memory access in this way, the access logic for the cache can thus be effectively re-configured, such that the distribution of memory traffic between the cache slices can be varied over time, e.g. based on system conditions.

This then allows more flexible graphics processor operation, in which the cache resource can be dynamically adapted for the particular processing that is being performed. Further, this can be done in a relatively simpler manner, i.e. by simply re-programming the (e.g. hash) function that is used by the access logic, and in embodiments without therefore requiring any more complex re-configuration of the graphics processor (hardware).

This can then provide increased flexibility and improved overall graphics processor performance.

For instance, in some more traditional arrangements, there may be a certain, set, e.g. default, mapping of different portions of the cache to memory address regions that is determined at SoC (system on chip) creation time, or as part of an initial configuration process, but is essentially then fixed such that the distribution of memory traffic is not subsequently changed over time.

In contrast, the technology described herein allows the graphics processor to dynamically control (and hence vary) how memory accesses from the plurality of processing cores are distributed across the plural cache slices so that the cache can be more flexibly allocated for use by different processing cores, e.g. in a more dynamic manner (in use). This can then provide various improvements, as will be explained further below.

The technology described herein may therefore provide various benefits compared to other possible approaches.

The technology described herein may be applied to any suitable and desired memory access. The memory accesses may therefore be memory accesses to read data from memory or memory accesses to write data from memory. The technology described herein can also be applied to sequences of memory accesses, e.g. that are performed in an 'atomic' (indivisible) fashion, such as a read-modify-write sequence, and/or to so-called 'coherency' accesses (e.g. that are performed as part of a defined cache coherency protocol in which the cache participates).

As mentioned above, according to the technology described herein, the cache slice that is used for a memory access is determined using a function (e.g. a hash function) computed based on at least part of the memory address associated with the memory access. Further, the function that is used to determine which cache slice should be used for a memory access is "programmable" (i.e. such that the function can be re-programmed over time to vary how memory accesses are distributed to cache slices over time).

For instance, when a memory access is issued from a processing core, it needs to be determined to which cache slice the memory access should be sent to. In the technology described herein, therefore, this is generally determined based on the memory address associated with the memory access, i.e. using the function mentioned above, but according to the technology described herein the function that is used to make this determination, and hence the mapping between cache slices and memory addresses, may change over time.

This can be managed in various ways, as desired.

For instance, the function may be set/programmed as part of a configuration process for the graphics processor. The function may then re-set/programmed, as desired, for a next instance of graphics processor operation, as part of a next configuration process, and so on.

In embodiments, however, the function that is used to determine which cache slice should be used for a memory access, and hence the distribution of memory accesses, can additionally/alternatively be dynamically varied "in use", i.e. during graphics processor operation.

In that case, the dynamic re-configuring of the function may be triggered based, e.g., on performance monitoring, e.g., and in particular, based on monitoring of caching behaviour/performance.

For example, the graphics processor may include one or more cache performance monitoring circuits that are operable to monitor one or more performance metrics relating to cache performance. These metrics may include, for example, a measure of cache hit/miss rates, a measure of cache tag re-allocation rate, a measure of the number of cache lines being filled, etc., but various other suitably metrics could of course be used in this regard.

If the cache performance monitoring indicates that the allocated cache resource is greater than is needed (i.e. because there are lots of cache hits and relatively fewer (or no) cache misses), it may be possible to restrict the cache resource that is available, and this may in fact be beneficial, e.g. to reduce overall energy consumption. For instance, in that case, one or more cache slices may be selectively disabled, e.g. powered down, and this may therefore directly reduce energy consumption associated with the cache. To account for this, the function that is used to determine which cache slice should be used for a memory access may thus be re-programmed accordingly based on the fact that one or more cache slices have been selectively disabled, i.e. such that memory accesses will be distributed (only) to the remaining (active) cache slices. The re-programmed function can then be provided appropriately, e.g. to the access logic, and then used accordingly to control how future memory accesses are distributed.

Various other examples would be possible in this regard, however, as will be described further below, and an effect and benefit of the technology described herein is that the distribution of memory accesses can be varied over time in any suitable and desired manner, with the function that is used to determine which cache slice should be used for a memory access being programmed, and re-programmed, as necessary, to support this.

The re-programming of the function that is used to determine which cache slice should be used for a memory access can be done in any suitable and desired manner, so long as the function can then be suitably provided to the relevant access logic (e.g. that is associated with the processing cores) that will use the function to determine which cache slice should be used for a memory access.

For example, and in some embodiments, this may be done by an appropriate "scheduling unit" within the graphics processor (e.g. a job manager/command stream frontend) that provides a respective virtual machine (software) interface for the graphics processor, and that is operable to schedule processing work to respective ones of the processing cores.

Such a scheduling unit may thus be operable in this regard to divide a processing task allocated to the graphics processor into smaller subtasks and distribute the subtasks for execution to respective ones of the processing cores (and other functional units) within the graphics processor, e.g. in the normal manner for such (work) scheduling within a graphics processor. A scheduling unit will thus typically be shared between a respective set of processing cores and operable to schedule processing tasks onto those processing cores.

(Thus, where the graphics processor can be configured as different respective partitions of processing cores, as described below, each partition may have its own respective scheduling unit.)

Thus, in embodiments, the graphics processor further comprises a scheduling unit that is operable to provide a respective virtual machine interface of the graphics processor and that is operable to receive processing jobs from a respective virtual machine and schedule corresponding processing tasks to processing cores within the graphics processor, wherein the scheduling unit is operable and configured to program the function that is used by the access logic to determine which cache slice should be used for a memory access.

That is, in embodiments, it is the scheduling unit that is operable to set/program the function that is used to determine which cache slices should be used for memory accesses. So, for example, in embodiments where the function is to be set/programmed based on cache performance monitoring, a result of the cache performance can be signaled to the relevant scheduling unit to cause the scheduling unit to set/program the function appropriately.

The scheduling unit can then communicate the newly set/programmed function accordingly to the access logic that is associated with the processing cores that share the scheduling unit, so that any memory accesses issued from those processing cores can be performed appropriately, using the desired function.

Other arrangements would however be possible. For example, rather than the graphics processor itself dynamically setting/programming the function, e.g. based on (cache) performance monitoring, this could be done by software, e.g. by the driver for the graphics processor, setting/programming an appropriate function, e.g. based on the processing work that is to be performed, and then signaling this function to the scheduling unit/access logic, as appropriate.

Various options would be possible in this regard.

In embodiments, as alluded to above, the graphics processor of the technology described herein can be configured, and re-configured, as respective different "partitions" of the processing cores within the graphics processor, and the technology described herein may provide further particular benefits in this context.

In this respect, the technology described herein can, and in embodiments does, support internal (hardware) separation between different partitions within the graphics processor, whilst still allowing the graphics processor to be flexibly configured (and re-configured) to support different processing operations, with the configuration of the partitions being managed (by a suitable controller/"partition access manager") as appropriate, e.g. depending on the processing operations that are to be performed by the different partitions. For example, as alluded to above, it is possible to flexibly and adaptably divide the processing cores (and other ancillary processing elements) of the graphics processor between a, e.g. "safety critical" partition and a non-safety critical partition, and for these partitions to be effectively isolated from each other (and this is what is in embodiments done).

Each partition can contain any suitable and desired number of processing cores. Thus, the partitions could each contain the same number of processing cores, but that is not essential, and different partitions may contain different numbers of processing cores, as desired. For example, one partition could contain a single processing core (or single group of processing cores), with another partition containing plural processing cores (or groups thereof).

The distribution of the available processing elements as between different partitions of those processing elements can be determined and set in any suitable manner. This may, and is in embodiments, done, for example, based on and in embodiments to match the processing performance requirements of the system in question. For instance, in the case of graphics processing, partitions that are intended to handle more complex graphics generation (e.g. for entertainment purposes) may be assigned more processing cores to meet the performance needs, while groups handling more simple graphics processing requirements (e.g. for a control panel) may be assigned fewer processing cores.

An advantage of being able to partition the graphics processor in this way is that the distribution of processing cores can be done flexibly and can be changed, by software or firmware, in use, depending upon the kind of system and application that the graphics processor is being used for.

In embodiments, in addition to being able to configure the processing cores into the different respective partitions, the allocation of cache slices to partitions (and hence to sets of processing cores) is in embodiments also configurable.

That is, rather than 'banks' of shader cores being associated with a particular cache slice, as part of a single graphics processing slice, and the partitioning of the graphics processor then being performed on the basis of such graphics processing slices, in embodiments, the processing cores and cache slices can be separately and independently configured into the different respective partitions.

The cache slices can thus be allocated to the different respective partitions, as desired, with the set of processing cores within a respective partition then only being able to use the cache slice (or slices) that have been allocated to that partition. If there is only a single partition, any and all (active) cache slices may thus be allocated to that partition. Whereas, if there is more than one partition, the cache slices may be suitably distributed between the partitions, e.g. depending on the desired cache resource that is to be provided to each partition.

Once a cache slice has been allocated to a respective partition, it is in embodiments then only usable by the set of processing cores within that partition (and so other processing cores that are not included in that partition will not be able to issue memory accesses to that cache slice, but will instead issue memory accesses to their respectively allocated cache slices).

According to the technology described herein, however, rather than there being a set (e.g. fixed) allocation of cache slices to sets of processing cores, the allocation of cache slices to sets of processing cores is configurable, such that the allocation of cache slices to sets of processing cores can be varied over time.

The allocation of cache slices to sets of processing cores can therefore be varied over time, e.g., and in embodiments, based on system conditions, such that appropriate cache resource is made available to different sets of processing cores for the particular processing that is being performed.

Thus, in embodiments, cache slices can be allocated to respective sets of processing cores within the graphics processor for use thereby for transferring data between the set of processing cores and the memory in which the data will be stored. Further, the allocation of cache slices to sets of processing cores is in embodiments dynamically configurable, e.g. such that the allocation of cache slices to sets of processing cores can be varied over time.

In particular, when the graphics processor is configurable into different respective partitions of the processing cores within the graphics processor, as mentioned above, the allocation of cache slices to the different respective partitions may thus be, and in embodiments is, dynamically configurable, such that different numbers of cache slices may be allocated to different respective partitions, and such that the number of cache slices allocated to a respective partition can change over time.

In such cases, therefore, the function that is used to determine which cache slice should be used for a memory access may be configured, and re-configured, appropriately so as to appropriately distribute memory traffic for the processing cores within a given partition to the (variable number of) cache slices that are allocated to that partition. In embodiments, therefore, each partition has its own respective function, and the functions are configurable on a per-partition basis.

That is, in embodiments, the plurality of processing cores are configurable as one or more respective partitions of the processing cores within the graphics processor, with respective cache slices being allocated to respective partitions of processing cores for use thereby, and the function that is used by the access logic to determine which cache slice should be used for a memory access is programmable (i.e. can be set) on a per-partition basis.

For instance, different numbers of cache slices can be allocated to different partitions of processing cores, and wherein when the graphics processor is partitioned into one or more respective partitions of the processing cores, the function that is used by the access logic to determine which cache slice should be used for a memory access for a particular partition is set based on the number of cache slices allocated to that partition to distribute memory accesses across the cache slices allocated to that partition. Thus, there may be an appropriate "partition access manager" within the graphics processor that is operable and configured to specify which resources, e.g. processing cores, scheduling units, etc., are allocated to which partitions, and a respective scheduling unit within a partition can then set/program the function that is to be used for memory accesses originating within that partition.

Thus, where there is only a single partition, all of the cache slices (or at least all of the cache slices that are active (i.e. not powered down)) may be allocated to that single partition, and the function that is used to determine which cache slice should be used for a memory access may be set/configured accordingly.

On the other hand, where there is more than one partition, a respective, potentially different, function can be set/configured for each partition, e.g. based on the desired distribution of memory accesses for that partition.

Various arrangements would be possible in this regard.

For example, in some situations, it may be desired to restrict the cache capacity available to a particular partition (e.g. to reduce energy consumption, as discussed above). In that case, one or more cache slices within a partition could be selectively disabled, with the function that is used to determine which cache slice should be used for a memory access (for that partition) then being set/programmed appropriately, in a similar manner described above.

Alternatively, or additionally, it may be desired to move one or more cache slices from a partition to another partition, e.g., and in particular, to increase or vary the cache resource available to the another partition.

For instance, if one partition is performing more cache-intensive processing work, it may be desired to increase the cache resource available to that partition. This can therefore be done by allocating a greater number of cache slices to that partition and then re-programming the function that is used to determine which cache slice should be used for a memory access for that partition appropriately.

Again, the technology described herein facilitates this as the function that is used to determine which cache slice should be used for a memory access may be set/configured appropriately for whatever allocation of cache slices to partitions.

There are various options in this regard.

For example, it might be desired to increase the cache capacity available for a particular set of processing cores (e.g. within a partition). In that case, a greater number of cache slices may be allocated for use by that set of processing cores, and the function that is used to determine which cache slice should be used for a memory access may be set/programmed appropriately, e.g., and in embodiments, to try to (e.g. evenly) distribute memory accesses between the cache slices within that partition. In that case, the different cache slices may be, and typically will be, mapped to different regions of the memory address space. This can then increase cache capacity.

However, the present Applicants recognise that in other situations it might be desired to be able to map multiple cache slices to a single, same memory address range (region), and this is also facilitated by the technology described herein, as in that case the function that is used by the access logic to determine which cache slice should be used for a memory access can be set so as to do this.

In this way, it may be possible to store more data (or metadata) associated with particular memory addresses. In embodiments, however, this is done to increase the cache associativity, i.e. to increase the number of 'ways' in which a cache line can be allocated to a memory address, and hence reduce conflict misses. For instance, if due to (expected or actual) access patterns, it is likely that there will be increased conflict misses for a particular processing operation, it may be appropriate to allocate multiple cache slices to a single, same memory address range to (try to) reduce conflict misses associated with that particular processing operation. Thus, in embodiments, the cache is an N-way, set associative cache, and the function that is used by the access logic to determine which cache slice should be used for a memory access is set to map multiple cache slices to a single, same memory address range to thereby increase the number of cache ways.

The technology described herein thus provides increased flexibility in this respect as it is possible to dynamically increase cache associativity, and to do this on a potentially per-memory address region basis.

In this case, when the function is set so as to map multiple cache slices to a single, same memory address range, the access logic may need to implement a suitable tiebreaking mechanism to select which cache slice should be used to perform a cache linefill, i.e. in response to a cache 'miss' (and the access logic is thus in embodiments operable and configured to do this).

For instance, when a memory access is issued via the cache, if the memory address associated with the memory access is mapped to multiple cache slices, the memory access could be processed via any of those cache slices, but generally should only be processed by one of them, and in embodiments a suitable cache policy is implemented such that this is the case. Any suitable and desired cache policy may be used in this respect to determine which one of the cache slices is used to perform the memory access in this case.

For example, when a memory access is issued to read data from memory via the cache, if the memory address associated with the memory access is mapped to multiple cache slices, it may be necessary to check each of the cache slices (and so this is in embodiments done). If the requested data is present in one of the cache slices, i.e. there is a cache "hit", the data can be returned accordingly.

On the other hand, if the data is not present in any of the cache slices, i.e. there is a cache "miss", the data will need to be read in to the cache from memory, e.g. by performing an appropriate cache linefill. In that case, the cache linefill should only be performed by a respective one of the cache slices, and so a suitable tiebreaking mechanism may be provided to select which cache slice should perform the cache linefill.

Similar considerations may apply to memory accesses to write data to the memory, e.g. to select which cache slice should be used to perform the write memory access, at least in the typical case where cache lines are both read and write allocable. Thus, in embodiments, the tiebreaking mechanism is used for both read and write memory accesses. This not need be the case, however, and other arrangements may be possible, e.g., and in particular, depending on the cache implementation. For example, if the cache is read only allocable, a cache "miss" on a write memory access may be performed directly, without having to perform a cache linefill. Accordingly, in some embodiments, the tiebreaking mechanism is used only for read memory accesses. Various other examples would be possible.

Thus, in embodiments, when the function is set so as to map multiple cache slices to a single, same memory address range, the access logic is configured to implement a tiebreaking mechanism to select which of the multiple cache slices allocated to a particular, same memory address range should be used in the event that a memory access to that particular memory address range results in a cache miss in each of the multiple cache slices mapped to the memory address range.

Any suitable tiebreaking mechanism may be used in this respect to select which cache slice should perform the memory access.

For instance, in some embodiments, this may be done by performing the memory accesses to the multiple cache slices in strict serial order, e.g., and in embodiments, so that in the event that there is a cache miss in each of the multiple cache slices, it is the last cache slice that performs the linefill. In this case the order in which the cache slices are checked may be any suitable order, and this order may be varied over time (e.g. in a random fashion).

In embodiments, however, the memory accesses are issued in parallel to the multiple cache slices. In that case, when issuing the memory read accesses to the cache slices, a suitable value may be sent to the cache slices together with the memory read access, which value is then used to identify which cache slice should perform the memory access if there is a miss in both cache slices. This can be implemented in various different ways.

For example, where there are two cache slices mapped to the same memory address region, a single bit value (e.g. a '0' or a '1') may be generated, that is then sent to both cache slices, and the selection of which of the two cache slices is used to perform the memory access is controlled depending on which value is sent. So, for instance, if the first value (e.g. '0') is sent, this may mean that one of the cache slices should be used (and not the other), whereas if the second value (e.g. '1') is sent, this may mean that the other one of the cache slices should be used. Alternatively, in another example, the first value may be sent to one of the cache slices and the second value sent to the other one of the cache slices, e.g. with the cache slice to which the (e.g.) second value was sent then being used to perform the memory access.

Other arrangements would of course be possible, for example depending on how many cache slices are mapped to the same memory address region. For instance, if there are N cache slices allocated to a single, same memory address region, a suitable value (e.g. a '1') may be sent to a selected one of the N cache slices to specify that it is that cache slice which should perform the miss operation in response to there being a cache miss in all of the cache slices, with another value (e.g. a '0') sent to the other cache slices.

In the event that there is a cache miss in both cache slices, this can be signaled appropriately, and the cache slice that is selected to perform the memory access may then be selected based on the respective value, e.g. such that the cache slice to which the first value was sent is used to perform the memory access.

Thus, in embodiments, when issuing a memory access to the cache, when the memory address associated with the memory access is mapped to multiple cache slices, the memory access is issued to each of the multiple cache slices in parallel, and the access logic is operable and configured to also send to each of the multiple cache slices a respective value that can be used to select which of the multiple cache slices allocated to a particular, same memory address range should be used in the event that a memory access to that particular memory address range results in a cache miss in each of the multiple cache slices mapped to the memory address range.

Which cache slice is selected (i.e. which value is sent to which cache slice) can be determined according to any suitable and desired cache slice selection/replacement policy.

For example, which value is sent to which cache slice can be, and in embodiments is, selected randomly, i.e. without considering usage patterns, so as to effectively implement a random cache selection/replacement policy to select between different cache slices allocated to a single, same memory address region. Such a random selection/replacement policy could be implemented using a linear feedback shift register scheme, for example. For instance, if there are N cache slices allocated to a single, same memory address region, with the N cache slices being numbered from 0 to N−1, a random number between 0 and N−1 could then be generated to determine which of the N cache slices should be selected to perform the memory access in the event that there is a cache miss in all of the cache slices. A suitable value (e.g. a '1') may thus be sent to that particular cache slice to specify that it is that cache slice which should perform the miss operation in response to there being a cache miss in all of the cache slices, with another value (e.g. a '0') sent to the other cache slices.

In other embodiments, however, this selection between cache slices could be made based on usage patterns, e.g. using a lifetime-based policy such as a least recently used (LRU) caching algorithm.

For example, in the case of issuing a memory access to read data from the cache, when the memory address associated with the memory access is mapped to multiple cache slices, the memory access is issued to each of the multiple cache slices in parallel, and the access logic is operable and configured to also send to each of the multiple cache slices a respective value that can be used in the event that there is a cache miss in each of the multiple cache slices to select which one of the multiple cache slices should be used to perform the linefill.

Various other examples would of course be possible.

It will be appreciated that in addition to selecting which cache slice should perform the memory access, it may also generally be necessary to select which line or lines (e.g. 'way') within the selected cache slice should be evicted/replaced when performing the memory access. Any suitable cache replacement policy may be used in this regard, as desired. For instance, in embodiments, a random allocation is used to select which cache slice is used, and a lifetime-based policy such as a least recently used (LRU) caching algorithm may then be used within that cache slice to select the line(s) that are to be replaced/evicted. That is, different replacement policies may be used at different levels of the process.

Whilst in the examples above the allocation of cache slices to partitions is primarily done to (try to) improve overall graphics processor performance (whether that be by increasing cache resource, where it is beneficial to do so, e.g. on a per-partition basis, or restricting cache resource to reduce energy consumption), it will be appreciated that the allocation of cache slices to partitions may also be done to mitigate defects in the cache.

For example, if there is a fault affecting a cache slice (or a portion of a cache slice) in one partition, it may be desirable to disable some or all of that cache slice. For example, it may be appropriate to completely disable the cache slice, e.g. and to deallocate that cache slice from a partition to which it has been allocated. This can therefore be done, with the function then being updated accordingly.

Alternatively, it may be appropriate to disable only the defective portion of the cache slice, and this can also be done, again by suitably updating the function. In that case, the other, functional portion of the cache slice may be allocated and used appropriately. For instance, if the fault is affecting less than all of the cache ways within the cache slice, the remaining cache ways may still be allocated and used essentially as normal, so long as the function is updated to take this into account. That is, if there is a defect affecting a cache slice, or a portion (e.g. a 'way') of a cache slice, that cache slice, or at least the portion of the cache slice affected by the defect, could be disabled. The technology described herein however allows further improvements in this regard. For example, if a particular cache way is affected, rather than having to disable that cache way (and hence reducing cache associativity), the function may be re-programmed to map another cache slice to that same memory address region to increase the number of cache ways.

As another example, it may be desirable to move a cache slice from one partition to another partition. For instance, if the graphics processor is partitioned into safety critical and non-safety critical partitions, it may be desirable to remove a faulty cache slice from the safety critical partition and to potentially then move a cache slice from the non-safety critical partition to the safety critical partition in its place. In this respect, it will be appreciated that the faulty cache slice may in some instances still be used, albeit in a reduced way. For example, it may be possible to implement a suitable memory error detection and/or correction scheme that allows the faulty cache slice to still be used, with the memory error detection and/or correction scheme being able to correct at least some errors. In that case, however, the faulty cache slice may be, and in embodiments is, allocated to a non-safety critical partition, as at least some of the cache slice resilience will be lost.

Various examples would be possible in this regard.

Thus, the allocation of cache slices to processing cores may generally be configured based on some or all of: current processing workloads within the graphics processor; a respective partitioning of the graphics processor; the presence of defects within the cache, and the function (or functions) that is used to control the distribution of memory traffic to the cache slices can be programmed and re-programmed appropriately for the particular allocation of cache slices to processing cores.

In the embodiments described so far, the function that is used by the access logic to determine which cache slice should be used for a memory access is primarily programmed on a per-partition basis. However, other arrangements would be possible. For example, in some embodiments, the function that is used by the access logic to determine which cache slice should be used for a memory access may additionally/alternatively be programmable on a per-processing job, or in embodiments on a per-processing task, basis so that memory accesses from the plurality of processing cores can be distributed across the plural cache slices differently for different processing jobs/tasks. This can then provide finer-grained control of memory traffic.

For instance, rather than trying to distribute memory traffic from a set of processing cores across the cache slices allocated to those processing cores, all of the memory traffic for a particular processing job (or a particular task associated with a processing job) could be issued to a single, same cache slice, e.g. to increase data locality within the cache.

In this case, the graphics processor may need to take care to avoid conflicts between processing jobs/tasks, but this can typically be managed by the scheduling unit (which as discussed above is in embodiments operable and configured to program the function that is used by the access logic to determine which cache slice should be used for a memory access).

As mentioned above, the function may in many situations be programmed/set to try to distribute memory traffic across the available cache slices. This will often make sense. As yet another example, however, if it is expected (or known) that particular data will only be used by particular processing core (or set of processing cores), the access logic may be operable to (try to) distribute the associated memory traffic for that data to cache slices that are physically closer to the particular processing core(s) that will use that data. This should then help reduce energy consumption and latency. To achieve this, a value may be computed based, e.g., on an appropriate processing core identifier, which value is used to select which cache slice should perform the memory access. Another value may then be computed based on the memory address associated with the memory access to select which cache line(s) within the selected cache are used to perform the memory access Various other examples where it may be beneficial to dynamically vary the allocation of cache slices to processing cores and/or the distribution of memory traffic to those cache slices would of course be possible and the effect and benefit of the technology described herein is generally to allow increased flexibility and configurability of the graphics processor's (shared) cache. This can in turn provide increased graphics processing performance and/or reduced energy consumption, i.e. by appropriate configuration of the graphics processor's (shared) cache.

For instance, as discussed above, the technology described herein allows one or both of the cache capacity and cache associativity to be flexibly varied in use, and this can be done either on a per-partition basis, or on a per-processing task basis. This can then allow for improved graphics processor performance, either by providing a more optimal cache resource for the current graphics processing operations (i.e. to reduce capacity and/or conflict misses), and/or by mitigating defects. Various arrangements are contemplated in this regard, as discussed above.

Further, by allowing the function that is used by the access logic to control the distribution of memory traffic to the cache slices to be dynamically programmed, this is in embodiments implemented in a relatively simpler manner, without requiring significant area increase or changes to the underlying access logic.

Subject to the particular requirements of the technology described herein, the function that is used to determine which cache slice should be used for a memory access may comprise any suitable and desired function. As mentioned above, the function is in embodiments a hash function.

The function may be computed over any suitable one or more properties associated with a memory access but in embodiments the (e.g. hash) function is computed over part of the memory address for a memory access. For example, a memory address may typically comprise a block offset, a (set) index, and a tag, and the function may, e.g., be, and in embodiments is computed using the tag, which is in embodiments used to specify which cache slice should be used, and the (set) index which is used to determine which entry within that cache slice should be used. Thus, the one or more properties based on which the function is computed in embodiments comprise at least part of the memory address associated with the memory access in question.

Other arrangements would however be possible and in general the function may be computed using any suitable portion of the memory address, as desired.

Further, the function may additionally/alternatively be computed over other properties of the memory access, as desired. In this way, the selection of which cache slice should be used may also take into account other information. For example, the selection of which cache slice should be used to perform a memory access may also take into account an identifier of the processing core that issued the memory access, and this may facilitate the access logic preferentially selecting a cache slice that is physically closer to the shader core from which the memory access originates, for instance, as mentioned above.

Further, as mentioned above, the function should be configurable. Thus, in embodiments, the function comprises a programmable hash function.

The hash function can therefore be changed over time, i.e. by re-programming the hash, to control how memory accesses from the plurality of processing cores are distributed across the plural cache slices.

Subject to the requirement to be operable in accordance with the technology described herein, the graphics processor may otherwise comprise any or all of the normal components, functional units, and elements, etc., that such a graphics processor may comprise.

For instance, as mentioned above, the graphics processor includes a set of plural processing cores for executing programs to perform processing work. In general the graphics processor may include any suitable and desired number and arrangement of processing cores.

Similarly, each processing core may otherwise comprise any or all of the normal components, functional units, and elements, etc., that such a processing core may comprise. Each processing core may have the same set of functional units, etc., or some or all of the processing core may differ from each other.

In particular, each processing core may, and typically will, comprise at least a respective programmable execution engine (or unit) that is operable to execute shader programs (and the processing cores may also accordingly be referred to as "shader" cores).

A (or each) processing (shader) core may however and typically will also contain various other functional units, and elements, etc., as desired, which other functional units, and elements may be implemented in substantially fixed-function hardware (although it will be appreciated that some degree of configurability may be provided). These other functional units, and elements may include, for example, fragment frontend and post-processing units, such as a primitive list reader, a rasteriser, early and late depth testing units, etc. These other functional units, and elements may also include hardware units such as a texture unit, a load/store unit, a ray tracing unit, etc., that may be triggered by shader program execution.

As also mentioned above, the graphics processor of the technology described herein is in embodiments configurable as different respective partitions of the processing cores within the graphics processor.

Thus, the technology described herein can, and in embodiments does, support internal (hardware) separation between different partitions within the graphics processor, whilst still allowing the graphics processor to be flexibly configured (and re-configured) to support different processing operations, with the configuration of the partitions being managed (by the controller) as appropriate, e.g. depending on the processing operations that are to be performed by the different partitions. For example, in this way, it is possible to flexibly and adaptably divide the processing elements of the graphics processor between a, e.g. "safety critical" partition and a non-safety critical partition, and for these partitions to be effectively isolated from each other (and this is what is in embodiments done).

A respective partition of the graphics processor may thus generally comprise and suitable and desired subset of the processing elements within the graphics processor.

For example, the graphics processor will have a set of plural processing (shader) cores and respective ones (or groups) of these processing (shader) cores can thus be divided between the partitions as desired, e.g. depending on the particular processing operations that the partitions are to perform. Thus, a first partition may be configured to have a first subset of the processing (shader) cores from the set of plural processing (shader) cores within the graphics processor, and a second partition may be configured to have a second subset of the processing (shader) cores, with each partition having a unique (non-overlapping) subset of the processing (shader) cores.

Various arrangements would be possible in this regard. For example, the processing (shader) cores could be divided equally between the partitions, but the processing (shader) cores could also be divided non-equally, e.g. so that one partition has a greater processing capability than another partition.

In addition to the processing (shader) cores, the graphics processor will also have various 'ancillary' processing elements that are shared between plural processing (shader) cores, and these ancillary processing elements may therefore also be suitably divided between the different partitions.

An example of such an ancillary processing element would be a "scheduling" unit that provides a respective virtual machine (software) interface for the graphics processor, and that is operable to schedule processing work to respective ones of the processing (shader) cores. For example, the scheduling unit may be operable in this regard to divide a processing task allocated to the graphics processor into subtasks and distribute the subtasks for execution to respective ones of the processing (shader) cores, e.g. in the normal manner for such (work) scheduling within a graphics processor.

In this respect, to facilitate such partitioning, the graphics processor of the technology described herein is in embodiments provided with a set of two or more scheduling units, and each partition should be configured with at least one of these scheduling units, i.e. with the scheduling unit(s) within a particular partition then being operable and configured to schedule processing work to the processing (shader) cores within that partition (e.g., and in embodiments, only to the processing (shader) cores within that partition such that a scheduling unit in one partition is not able to schedule processing work to processing (shader) cores within another partition).

These scheduling units may take any suitable and desired form. For example, these scheduling units may be in the form of a suitable "job manager" and/or "command stream frontend".

In an embodiment, the graphics processor is a tile-based graphics processor, and so the processing elements of the graphics processor also include one or more geometry processing/binning unit (e.g. a tiler or hierarchical tiler). In embodiments, the graphics processor may include plural geometry processing/binning units, such that different partitions can be configured with respective, different geometry processing/binning units. In general, however, the geometry processing/binning may be performed in various suitable ways. For example, rather than providing a dedicated tiler or hierarchical tiler that performs the binning process, the binning could be performed in a distributed manner, e.g. using the processing cores.

In general the graphics processor may include any other suitable and desired ancillary processing elements, e.g. that a graphics processor might typically or desirably have, and these may be partitionable in any suitable manner.

In the normal manner for graphics processor operation, the graphics processor may be used to perform (graphics) processing work for one or more virtual machines (software applications) that are executing on a host processor (e.g. CPU) of the data processing system that the graphics processor is a part of.

Thus, the host processor (e.g. CPU) will typically be executing one or more applications, and may trigger the graphics processor to perform some (graphics) processing work, as needed, with the graphics processor thus acting as an accelerator for that processing work.

In general, there may be various different processing operations that need to be performed by the graphics processor, potentially for different virtual machines, and it may be desired, e.g. for formal (functional) safety requirements, for these processing operations to be performed independently of each other. The partitioning of the graphics processor according to the technology described herein thus in embodiments allows the graphics processor to support this, with different partitions being used to perform different processing operations, and with the partitioning providing effective hardware isolation between the different partitions such that the different processing operations can be performed suitably independently.

Thus, in embodiments, as alluded to above, different partitions may be used to perform processing work with different levels of safety requirements, for example, such that a first partition is used to perform safety critical processing work whereas a second partition is used to perform non-safety critical processing work.

That is, at least in embodiments, the available processing elements are divided into two (or more) partitions, with one of the partitions intended to be used and operated within a "safety critical" domain (this partition accordingly being referred to herein as a "safety critical partition"), and another of the partitions intended to be used for and operable in a non-safety critical domain (i.e. a "non-safety critical partition").

Various arrangements would be possible in this regard.

The data processing system that the graphics processor is a part of in embodiments also comprises a controller that that allocates and organises the processing elements according to the desired partitions. The controller (circuit) in embodiments also ensures that the different partitions remain sufficiently separate.

For instance, the graphics processor may, and in embodiments does, comprise a "partition access manager" (unit) that is operable to communicate with the various processing elements within the graphics processor, and the access manager (unit) may comprise a suitable microcontroller or processor that is operable to (e.g., execute software to) perform the allocation and organisation of the processing elements within the graphics processor according to different configurations. In that case, the controller (i.e. access manager (unit)) may also typically communicate with a higher level (system) controller that is external to the graphics processor.

Alternatively, the controller that allocates and organises the processing elements within the graphics processor could reside outside of the graphics processor. For example, in embodiments the allocation and organisation of the processing elements within the graphics processor according to different configurations is performed by software executing on the host processor, e.g., and in particular, by the driver for the graphics processor. Thus, in embodiments, the controller (circuit) resides on a host processor of the data processing system that the graphics processor is a part of. In that case, a local access interface (e.g. the access manager (unit)) may be provided within the graphics processor that is operable to route signals/messages between the external controller and the individual processing elements within the graphics processor, as appropriate, according to the desired configuration of the processing elements within the graphics processor.

Various arrangements would be possible in this regard.

The controller is thus in embodiments operable to manage and enforce the partitioning of the graphics processor to ensure the independent operation of the different partitions, and this is in embodiments facilitated by the access manager (unit), where this is provided. For instance, the access manager of the graphics processor may be, and in embodiments is, operable to exchange signals/messages with the individual processing elements within the graphics processor to control their operation, but this may be done under the overall control of a higher level (system) controller that is external to the graphics processor (e.g. this controller may be implemented in software executing on the host processor, as above).

The processing elements (within the graphics processor) can be allocated to respective partitions of processing elements in any suitable and desired arrangement and distribution. The processing elements should be and are in embodiments arranged as plural (separate) partitions of processing elements. In one embodiment, there are two partitions of processing elements, but it would be possible to have more than two partitions of processing elements, if desired.

Each partition of processing elements should, and in embodiments does, comprise different processing elements of the plurality of processing elements to all of the other partitions of processing elements. Thus there should be, and is in embodiments, no sharing of processing elements between the different partitions of processing elements. Correspondingly, each partition of processing elements will comprise its own unique and exclusive set of one or more processing elements, that does not share any processing elements with any of the other partitions of processing elements that have been assigned.

Thus, in an embodiment, the controller is operable to (e.g. logically) separate the plural processing elements into plural (e.g. two) partitions, wherein each group comprises a respective subset of the processing elements, and the plural partitions are distinct from each other, i.e. each processing element belongs to only one partition.

In embodiments, the controller is operable to be able to move processing elements from one partition to another, e.g., and in embodiments, in response to some event that may be detected and conveyed to the controller.

Allowing the processing elements to be moved between partitions in use provides even greater flexibility.

In the case where the controller wishes to move a processing element or elements from one partition to another (to reconfigure the partitions of processing elements), there is in embodiments an appropriate "handshaking" procedure, e.g. with the virtual machines for the respective partitions, to allow any processing elements that are being moved between the partitions to be appropriately stopped and restarted (once they have moved to a different partition), and, for example, any tasks that they were performing to be appropriately suspended. This process in embodiments also includes resetting and/or powering off (and restarting) the processing elements, etc., in question.

The controller that allocates and organises the processing units into respective groups of one or more processing units can take any suitable and desired form.

The controller can operate to configure the respective partitions of processing elements in any suitable and desired manner. In an embodiment, it operates to configure a (configurable) communications network that sets the communications paths between the processing elements, and to the controller, to set the appropriate communications paths between the processing elements and to the virtual machines, so as to configure the graphics processor to have the desired configuration.

The configurable communications network may, for example, comprise a configurable interconnect and/or communications network comprising appropriate switches, and/or for which the address mapping can be configured, etc., such that respective processing elements can each independently and selectively be connected to different communication buses and/or to each other, so as to, for example, allow the processing elements to be configured into respective partitions of processing elements that are then connected "together" to a communications bus for that group of processing elements.

Thus there is in embodiments an appropriately configurable communications network, e.g. including one or more configurable interconnects, e.g. together with appropriate switches, that can be configured by the access manager to set up the desired partitions of processing elements, and the appropriate communications paths between the respective partitions of the processing elements and the virtual machines that are to use the partitions.

The controller in embodiments comprises a set of configuration registers for configuring and/or controlling the partitions of processing elements, etc.

In an embodiment, the controller supports a particular, in embodiments selected, and in embodiments fixed, (total) number of partitions (subsets) that the processing elements can be divided into. For example, the graphics processor may support two partitions of the processing elements, with the controller correspondingly being operable to divide the processing elements between those two partitions. As discussed elsewhere, the controller could, e.g., however, allocate the same number of processing elements to each partition, or could allocate different numbers of processing elements to different partitions, as desired.

The graphics processor will also comprise an appropriate communications network for providing communications between the various units of the graphics processor, such as memory transactions between processing cores and/or the cache of the graphics processing unit, subtask control traffic between the scheduling unit (job manager/command stream frontend) and processing cores and so on.

Other configurations of graphics processor would, of course, be possible.

As mentioned above, the graphics processor will typically be provided as part of a larger data processing system, the data processing system including a host processor (e.g. CPU) for which the graphics processor is able to act as an accelerator.

The data processing system that the graphics processor is part of may comprise any suitable processing units, controllers, arbiters, virtual machines (and their host processors), etc., for operation in the manner of the technology described herein. The data processing system may also include any other suitable and desired components, elements, units, etc., that a data processing system may comprise.

Thus, the data processing system may, e.g., include one or more peripheral devices, such as one or more output devices (e.g. display screens, vehicle controllers, etc.), and/or one or more input devices (e.g. human-computer interfaces, vehicle sensors, etc.). The virtual machines (host processors) may have access to the same set of one or more peripheral devices, or, e.g., a separate set of peripheral devices may be provided for different groups of virtual machines (again, this may be beneficial for safety and/or security purposes).

The overall data processing system in embodiments includes appropriate (system) memory for storing the data used by the graphics processor (and any other processing units when carrying out processing and/or for storing the data generated by the graphics processor (or other processing units) as a result of carrying out processing.

Thus, in an embodiment, the data processing system includes the graphics processor (or plural, similar graphics processors), and one or more host data processing units (processors) (e.g. CPUs) on which one or more virtual machines execute (in embodiments together with one or more drivers (for the graphics processor(s))).

In an embodiment, the data processing system and/or graphics processor comprise, and/or are in communication with, one or more memories and/or memory devices that store the data described herein, and/or that store software for performing the processes described herein.

The technology described herein can be used for all forms of output that a graphics processor may output. Thus, it may be used when generating frames for display, render-to-texture outputs, etc. However, the technology described herein can equally be used where the graphics processor is to be used to provide other processing and operations and outputs, for example that may not be or may not relate to a display or images. For example, the technology described herein can equally be used for non-graphics use cases such as ADAS (Advanced Driver Assistance Systems) which may not have a display and which may deal with input data (e.g. sensor data, such as radar data) and/or output data (e.g. vehicle control data) which isn't related to images. In general, the technology described herein can be used for any desired graphics processor data processing operations, such as GPGPU (general purpose GPU) operations and/or machine learning processing operations.

In one embodiment, the various functions of the technology described herein are carried out on a single system on chip (SoC) data processing system.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and units of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising on a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows an exemplary data processing system 100 that can be operated in accordance with the embodiments of the technology described herein.

As shown in FIG. 1, the data processing system 100 includes a central processing unit (CPU) 102, a graphics processor (graphics processing unit) (GPU) 101, and a display controller 103 (coupled to a display panel 104), that communicate via an interconnect 105. The central processing unit (CPU) 102, graphics processor (graphics processing unit) (GPU) 101, and display controller 103 also have access to off-chip memory 130, in this example in the form of synchronous dynamic random-access memory (SDRAM), for storing, inter alia, frames to be displayed, via a memory controller 106.

In the normal manner for such data processing systems, the graphics processor 101 may be available as an accelerator for certain types of processing work. Thus, an application executing on the central processing unit (CPU) 102 may require (graphics) processing operations to be performed by the graphics processor 101. To do this, the application will generate API (Application Programming Interface) calls that are interpreted by an appropriate (software) driver for the graphics processor GPU 101 that is running on the central processing unit (CPU) 102 and that generate appropriate commands for the graphics processor 101 to perform the processing required by the application.

In use, the graphics processor 101 will, for example, generate for the application a sequence of frames for display, or perform other desired processing (e.g. general purpose compute and/or machine learning processing), the outputs of which are stored via the memory controller 106 in a frame buffer in the off-chip memory 130. Then, when the frames are to be displayed, the display controller 103 will read the frames from the frame buffer in the off-chip memory 130 via the memory controller 106 and send them to a display panel 104 for display.

Figure 2:
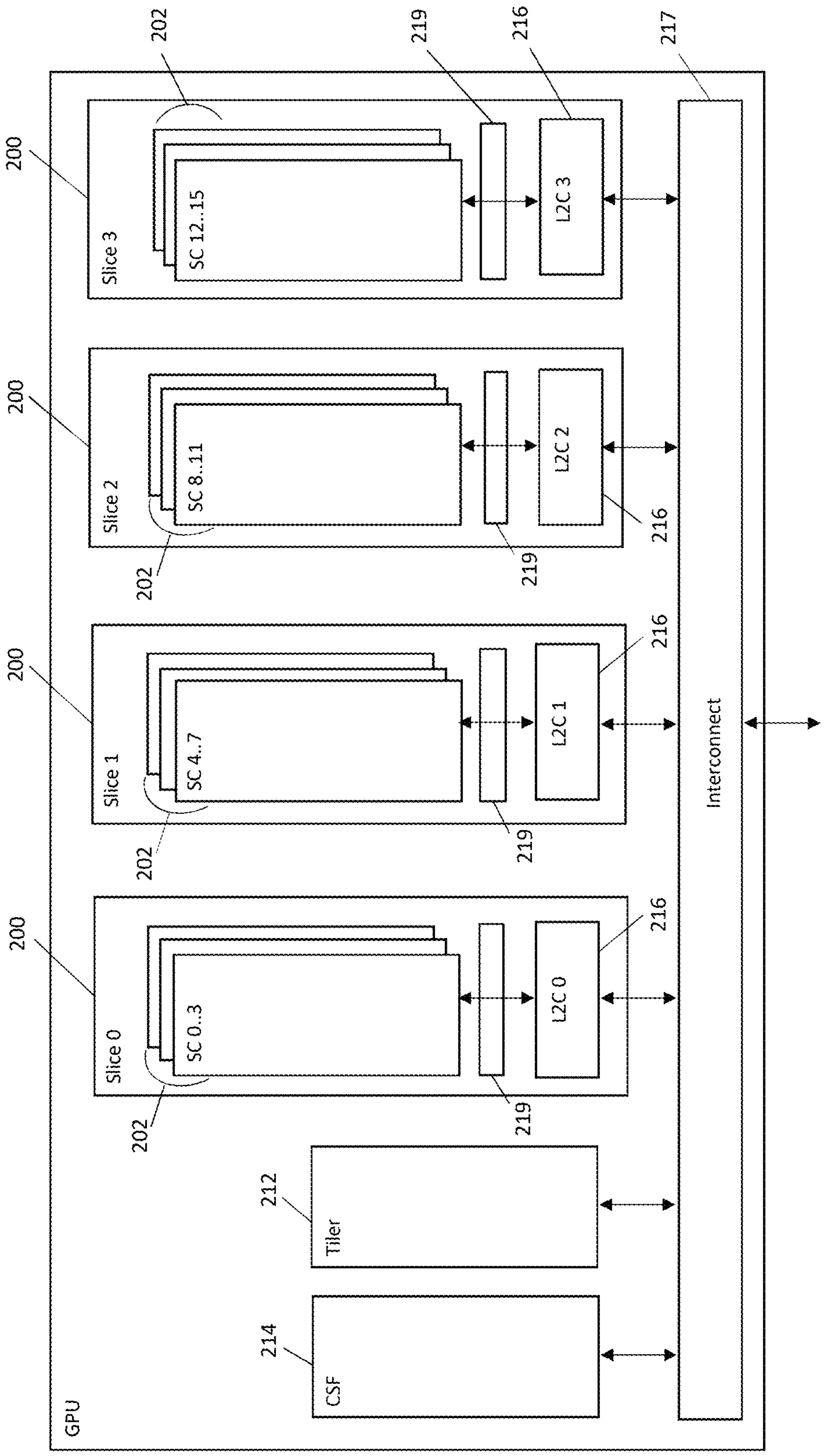
FIG. 2 shows schematically an embodiment of a graphics processor.

FIG. 2 shows in more detail an embodiment of a graphics processor (graphics processing unit) (GPU) (such as the graphics processor (graphics processing unit) (GPU) 101 in FIG. 1).

As shown in FIG. 2, the graphics processor includes plural graphics processing "slices" 200 that are provided along the same interconnect 217.

Each graphics processing slice 200 includes a respective bank of (four, in this example) shader (processing) cores 202 and a respective L2 cache slice 216 (i.e. a respective portion of a shared (L2) cache within the graphics processor that is operable to communicate via the interconnect 217 with the off-chip memory system of the data processing system that the graphics processor is a part of.

Respective memory access logic 219 is also provided in, or in association with, each graphics processing slice 200 to control how memory accesses issued from the shader (processing) cores 202 within the graphics processing slice 200 are distributed to the respective L2 cache slice 216 that is allocated for that graphics processing slice 200.

The graphics processor also includes a suitable "scheduling" unit, in the form of a command stream frontend ("CSF") 214, that provides the virtual machine (software) interface for the graphics processing unit and are also operable to divide a processing job allocated to the graphics processing unit into respective processing tasks and to distribute the tasks to the shader (processing) cores within the graphics processing slices 200 for execution. The command stream frontend 214 is thus operable to communicate over the interconnect 217 with respective ones of the graphics processing slices 200 to schedule processing tasks to the shader (processing) cores within those graphics processing slices 200.

Although not shown in FIG. 2, a (and each) shader (processing) core may thus comprise a suitable shader core "endpoint" that is operable to schedule processing work (i.e. tasks) to the execution engine within the shader (processing) core and corresponding fragment thread creation circuitry that is operable to generate appropriate execution threads for execution.

The command stream frontend 214 may thus issue fragment processing tasks to the shader core endpoint of a respective shader core accordingly to cause the shader (processing) core to perform desired fragment processing work. The command stream frontend 214 may also generally be able to schedule other desired processing work for the graphics processor, including geometry processing work that is to be performed in advance of the fragment processing work (e.g. in a tiled-based rendering system), but also including other types of work such as compute and neural network processing work that may or may not be related to the fragment processing.

Indeed, in the present embodiments the graphics processor (graphics processing unit) (GPU) is operable to perform tile-based rendering and so also includes a suitable tiler unit 212 that is again operable to communicate over the interconnect 217 with the command stream frontend 214 and/or the respective shader (processing) cores within the graphics processing slices 200 to perform tiling operations on request.

In the example shown in FIG. 2, there are thus 16 shader (processing) cores 202 and four L2 cache slices 216. A suitable hash function is used to distribute the memory address space between the four L2 cache slices 216, e.g., and in embodiments, to try to evenly distribute memory traffic between the four L2 cache slices 216. Thus, when a shader (processing) core 202 issues a memory access, the respective memory access logic 219 associated with that shader (processing) core 202 computes the hash function from the memory address associated with the memory access, and the memory access logic 219 determines on this basis to which of the four L2 cache slices 216 the memory access is issued to.

The hash function thus defines a mapping between memory addresses and the L2 cache slices 216.

The same default mapping between memory addresses and the L2 cache slices 216 could always be used, e.g. to try to always distribute memory traffic evenly between the available L2 cache slices 216. The present inventors recognise however that this default mapping may not always be appropriate for the current processing conditions within the graphics processor.

For instance, by monitoring the cache performance, it may be possible to identify instances where it is desirable to vary the distribution of memory traffic to the L2 cache slices 216.

In a simple example, this may comprise selectively disabling, e.g. powering down, some of the L2 cache slices 216, e.g. to reduce energy consumption.

Figure 3:
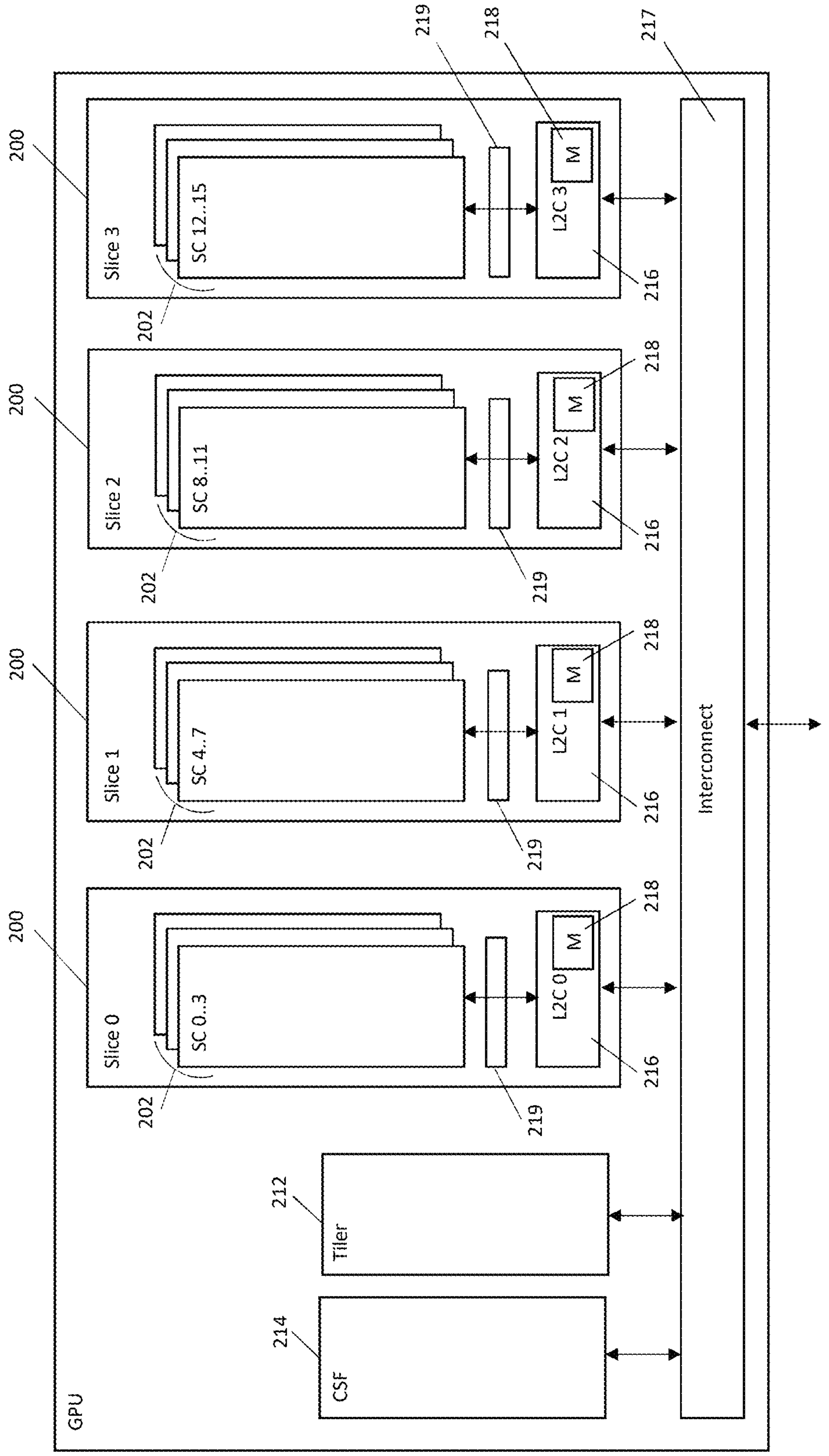
FIG. 3 shows schematically another embodiment of a graphics processor in which cache performance is monitored.

FIG. 3 thus shows another graphics processor that is generally similar to that shown in FIG. 2, described above, but wherein each L2 cache slice 216 has an associated monitoring unit 218 that is operable to monitor caching behaviour within that L2 cache slice 216. If, for example, the monitoring unit 218 detects that there are lots of cache hits, this may indicate that the amount of caching resource is more than is needed. Thus, it may be desirable to selectively disable some of the L2 cache slices 216, e.g. to allow those L2 cache slices 216 to be powered down, and hence to reduce energy consumption.

Figure 4:
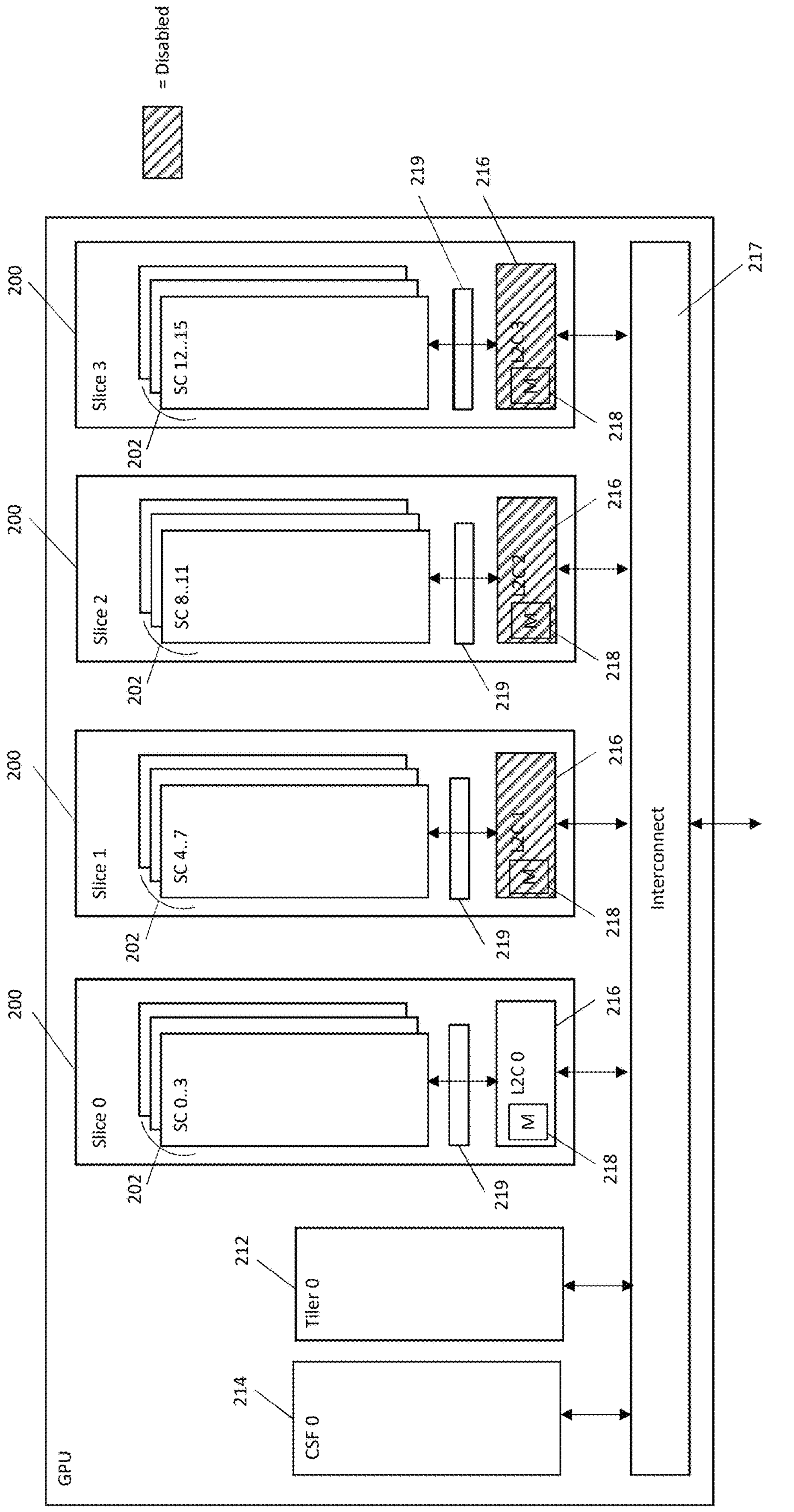
FIG. 4 shows schematically an example of a graphics processor in which L2 cache "slices" are selectively disabled to reduce energy consumption.

An example of this is shown in FIG. 4 wherein the L2 cache slices 216 associated with three of the graphics processing slices ('Slice 1', 'Slice 2' and 'Slice 3') have been disabled. In this example, therefore, the hash function that is computed by the memory access logic 219 and used to distribute the memory address space is modified so that all memory accesses are sent to the single active L2 cache slice 216 ('Slice 0'). In this way, the cache resource can be dynamically restricted, when it is determined that it may be beneficial to do so.

For instance, the monitoring units 218 may monitor cache hit/miss rates and signal this information back to the command stream frontend 214 to trigger the command stream frontend 214 to dynamically re-program the hash function (i.e. the mapping) based on which L2 cache slices are active. The new hash function that is to be used by the memory access logic 219 can then be signaled appropriately to the memory access logic 219 so that this is done.

In other approaches, rather than doing this dynamically by the command stream frontend 214, the driver for the graphics processor may be operable to set the hash function appropriately, e.g. based on analysis or knowledge of the memory requirements for the processing jobs it is submitting to the graphics processor. This information can then be provided by the driver, in suitable data structures, which can be fetched by the command stream frontend 214 and used to set/program the hash function appropriately based on the desired cache configuration.

According to some embodiments, the graphics can further be configured (and re-configured) as different respective "partitions" within the graphics processor, and the technology described herein can provide further improvements in this context.

For instance, as discussed above, the graphics processor includes a plurality of (different types of) processing elements, including the (banks of) shader (processing) cores (i.e. the graphics processor slices 200), but also including various 'ancillary' processing elements such as the command stream frontend 214 and tiling unit 212, that communicate over the same interconnect 217.

Figure 5:
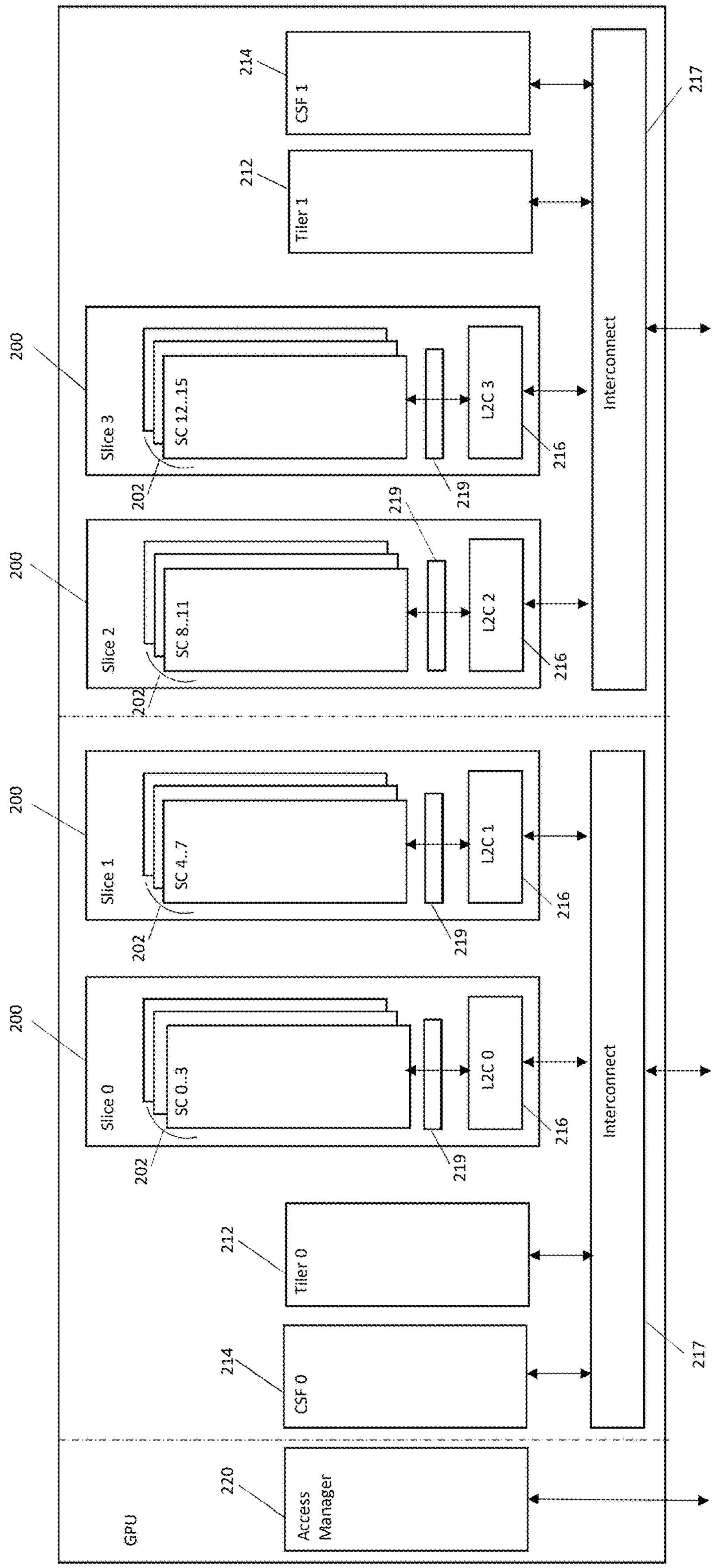
FIG. 5 shows schematically another embodiment of a graphics processor that can be configured into different respective "partitions" of the processing elements within the graphics processor.

For example, FIG. 5 shows an example of a graphics processor that is partitioned into two, respective partitions, with each partition having a respective (different) set of processing elements.

To facilitate this partitioning, as shown in FIG. 5, the graphics processor may be provided with duplicate command stream frontends 214 and tiling units 212, so that each partition can have its own set of such ancillary processing elements (although this may not be strictly necessary). Further, as also shown in FIG. 5, a partition access manager 220 is provided that is operable and configured to control access to the respective processing elements according to the desired partitions.

The partition access manager 220 thus controls the partitioning of the graphics processor (graphics processing unit) (GPU), and then controls access to the respective processing elements within each partition accordingly, i.e. to maintain the desired (hardware) isolation of the partitions.

This partition access manager 220 may also be in communication with a higher level (system) controller (not shown), e.g. that may be coupled to the software driver for the graphics processor (graphics processing unit) (GPU) on the central processing unit (CPU) 102, and that sets the configuration of the graphics processor (graphics processing unit) (GPU) and signals this to the partition access manager 220.

FIG. 5 thus shows a first example in which the graphics processor is divided into two equal partitions.

Thus, as shown in FIG. 5, the first partition includes one of the command stream frontends 214 ('CSF0'), one of the tiler units 212 ('Tiler 0'), half of the shader (processing) cores 200 ('SC 0 . . . 7'), along with the respective shared (L2) caches 216 for those shader (processing) cores 202, and a respective portion of the interconnect 217. The second partition then includes the other of the command stream frontends 214 ('CSF01), the other of the tiler units 212 ('Tiler 1'), the other half of the shader (processing) cores 200 ('SC 8 . . . 15') with their respective shared (L2) caches 216, and a different respective portion of the interconnect 217.

Thus, the different partitions are effectively isolated in hardware, and so can be used to perform different and independent processing operations.

It will be appreciated that FIG. 5 merely shows one example of possible partitioning, and in general, the graphics processor may be partitioned into different partitions, as desired. Thus, whilst FIG. 5 shows an example where the different partitions have equal processing capability, it may in some situations be desirable to instead partition the graphics processor into partitions of different processing capabilities, such that one partition has a greater number of shader (processing) cores than the second partition. This may be appropriate where different processing operations are to be performed wherein one operation requires greater processing effort.

In some implementations, this could be done by partitioning the graphics processing slices 200 (as a whole).

In that case, the L2 cache slices 216 would remain associated with a particular set of shader (processing) cores 202, i.e. as part of a particular graphics processing slice 200. Thus, the allocation of L2 cache slices 216 to shader (processing) cores 202 would be defined by the graphics processing slices 200 (e.g. similarly as in FIG. 2, discussed above).

The inventors recognise however that this default allocation of L2 cache slices 216 to shader (processing) cores 202 may not always be appropriate and that improvements may be achieved by allowing the allocation of L2 cache slices 216 to shader (processing) cores 202 to be varied over time.

Figure 6:
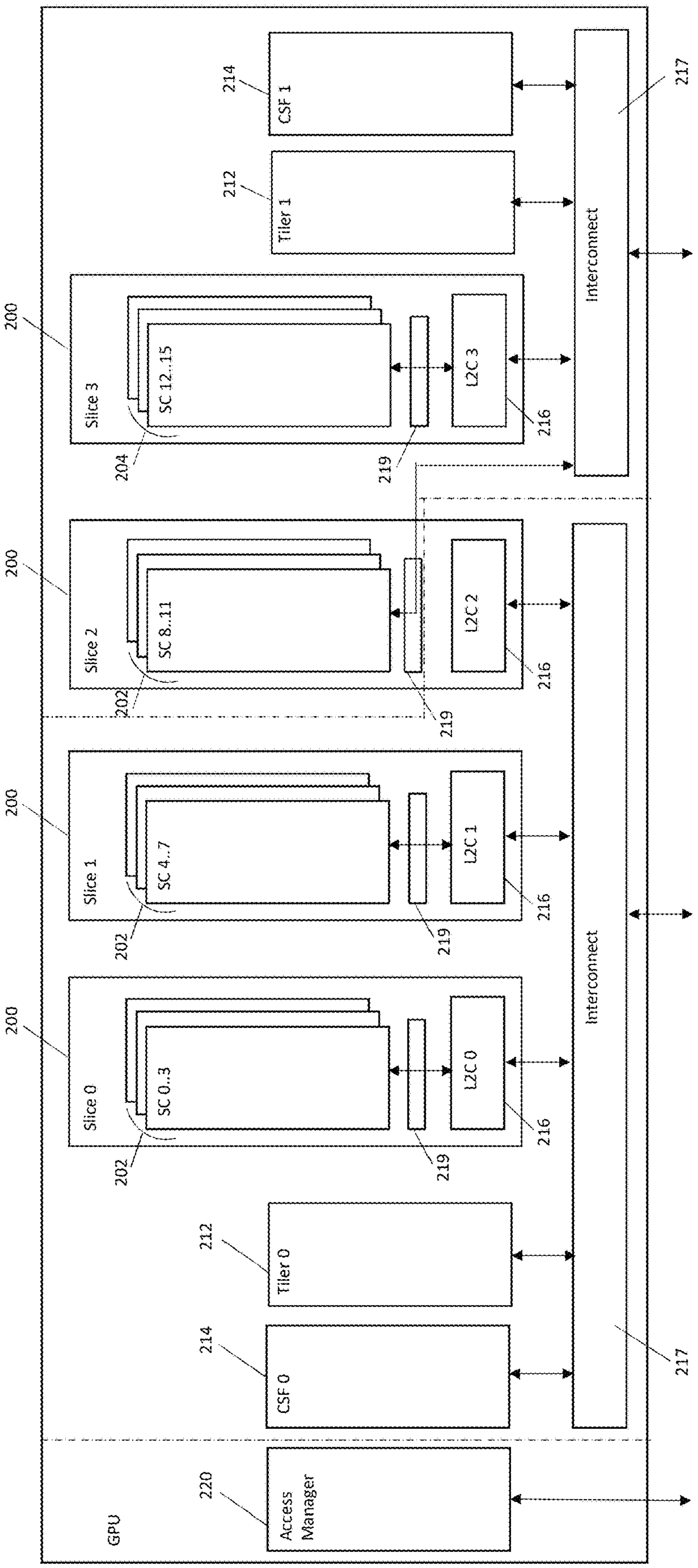
FIG. 6 shows the graphics processor of FIG. 5 but where there is a different allocation of L2 cache slices to partitions.

For instance, as shown in FIG. 6, if it is desired to allocate greater L2 cache resource to the first partition, according to the present embodiments this can be done by re-allocating one or more L2 cache slices from the second partition to the first partition. Thus, if it is detected, e.g. based on cache performance monitoring, that one of the partitions should be allocated greater cache resource, this can be done by effectively moving one of the L2 cache slices into that partition.

Correspondingly, the hash function that is used to distribute memory traffic to the L2 cache slices for that partition can then be modified accordingly, based on the number of L2 cache slices within that partition and the desired distribution of memory traffic to those L2 cache slices. This then has the effect, as shown in FIG. 6, of moving one of the L2 cache slices 216 into a different partition.

Figure 7:
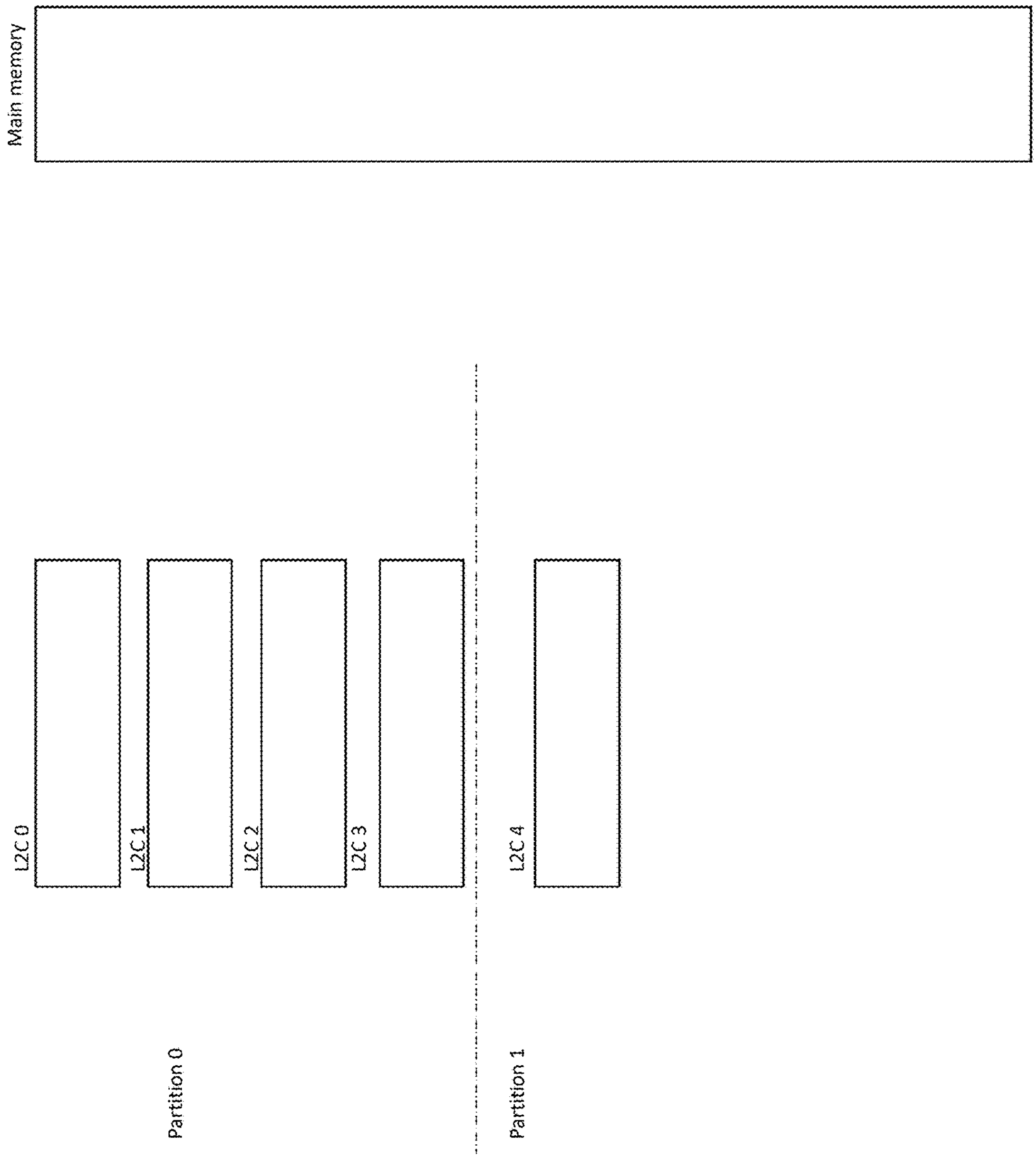
FIG. 7 shows another example of a graphics processor that can be configured into different respective "partitions" of the processing elements within the graphics processor.

FIG. 7 shows another example of this in which the L2 cache is divided into five slices, wherein four of the L2 cache slices are allocated to the first partition ('Partition 0') and one of the L2 cache slices is allocated to the second partition ('Partition 1'). So, if each L2 cache slice provides 64 KB of cache, the first partition has a total of 4×64 KB=256 KB of cache, whereas the second partition has 64 KB of cache. Increasing the amount of cache can then reduce the number of cache misses. Thus, if the first partition is performing processing work that is likely to be more cache-intensive, it may be appropriate to allocate greater cache resource to the first partition, e.g. to reduce the number of capacity misses.

Figure 8:
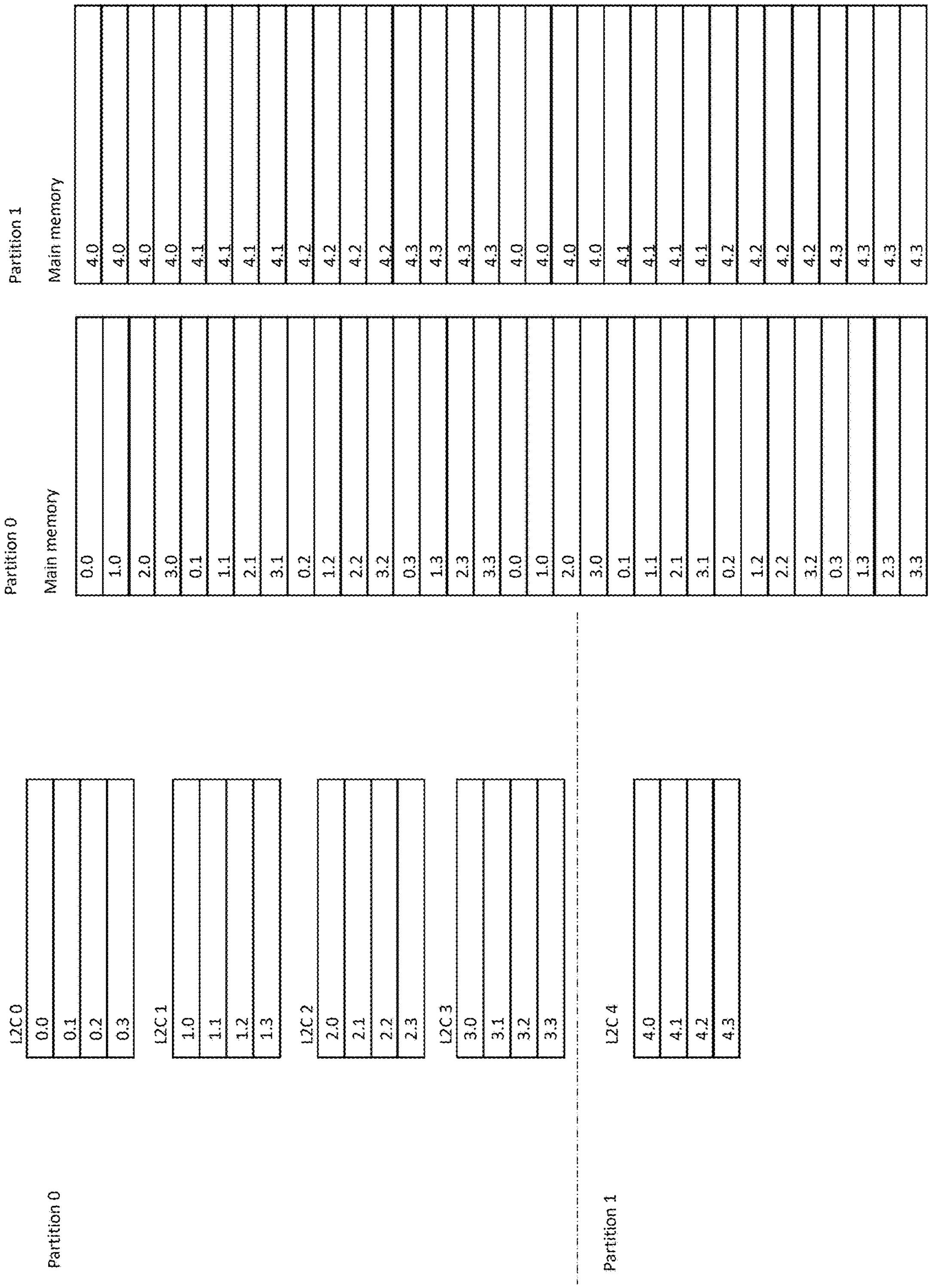
FIG. 8 shows an example memory address mapping that may be used within a graphics processor.

FIG. 8 then shows the corresponding memory address mapping used in this example. Thus, as shown in FIG. 8, in the first partition, the memory address mapping is performed such that the four L2 cache slices are interleaved in memory address space. In this example, each of the cache lines within the four L2 cache slices allocated to the first partition is mapped to two addresses in main memory. Whereas, in the second partition, each cache line is mapped to eight addresses in main memory.

(It will be appreciated that a real memory system will typically be much more complex and there will typically be a larger number of cache lines in a cache slice and significantly more addresses in main memory than what is shown in FIG. 8. Further, in a real memory system the memory addresses may be scrambled and more complex mapping schemes may be used.)

This memory mapping can be achieved using a suitable hash scheme that is computed over the cache index, with in this example different hash functions being used for the different partitions based on the different cache resources that are available. Thus, in the example shown in FIG. 7 and FIG. 8, the allocation of L2 cache slices to partitions can be controlled to increase cache capacity in the first partition by allocating a greater number of cache slices to the first partition.

The example shown in FIG. 7 and FIG. 8 relates to a direct-mapped cache in which the L2 cache is organized into multiple sets with a single cache line per set. The cache line that is used for a memory access is thus computed based on the memory address associated with the memory access.

Figure 9:
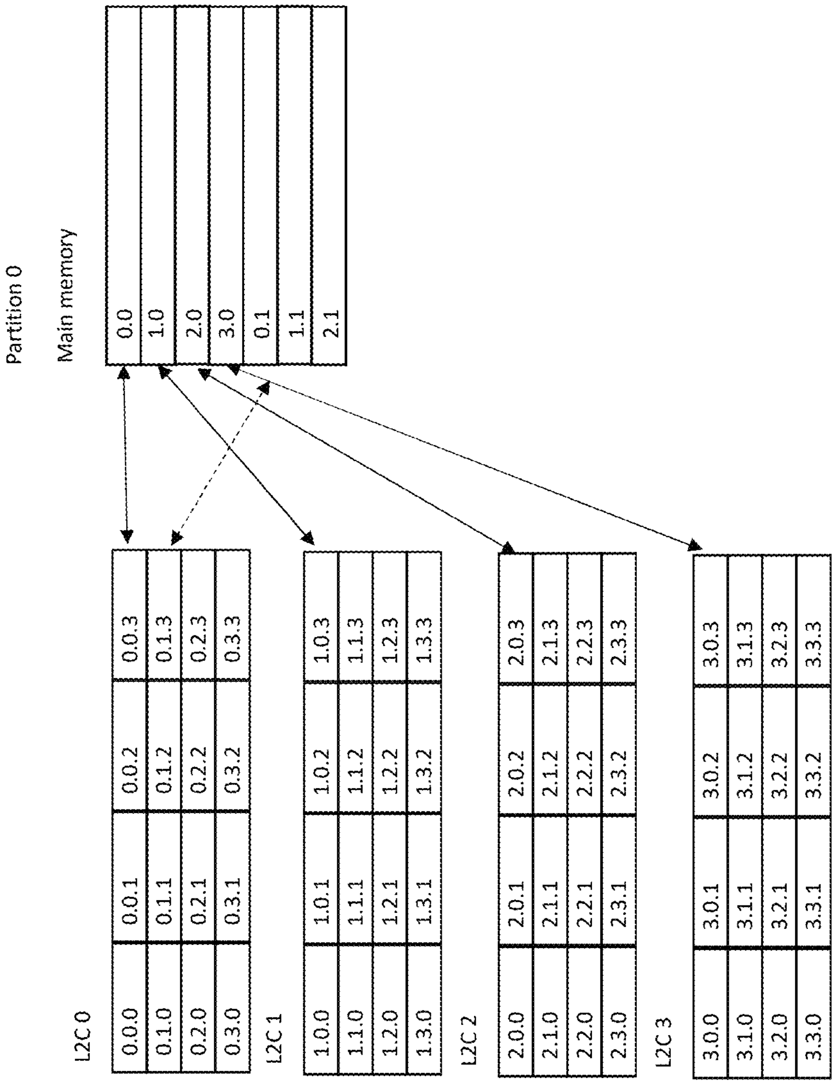
FIG. 9 shows another example memory address mapping that may be used within a graphics processor.

More typically, the L2 cache within a graphics processor will be a set-associative cache in which there are multiple 'ways' in which a cache line can be allocated. FIG. 9 shows an example of this, in particular showing a 4-way set associative cache in which each cache line can be mapped to a corresponding memory address in four separate ways. Although FIG. 9 shows a four-way set associative cache it will be appreciated that an L2 cache within a graphics processor will often have greater associativity.

Figure 10:
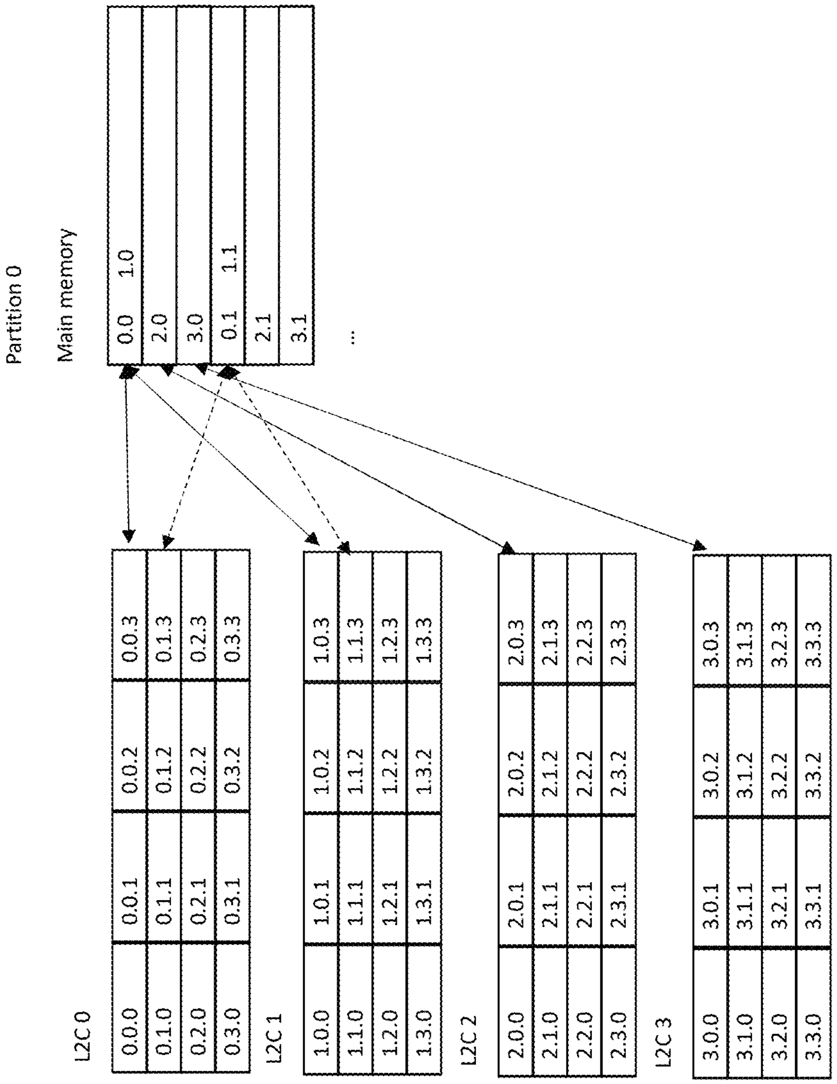
FIG. 10 shows yet another example memory address mapping that may be used within a graphics processor.

FIG. 10 thus shows an example in which multiple cache slices are mapped to the same memory address in order to increase the number of cache ways. In particular, in this example, as above, there are four L2 cache slices allocated to the partition, such that partition has a total of 4×64 KB=256 KB of cache. However, as shown in FIG. 10, two of the caches slices (namely, 'L2C 0' and 'L2C 1') are mapped to the same memory address. This thereby provides twice as many locations that a line in the main memory can be mapped into the cache, hence increase the number of ways for these locations from 4 to 8.

In this way, the cache associativity can be increased for certain memory address regions, to thereby help reduce the number of conflict misses. This may therefore help improve overall caching performance. There are however various reasons why this might be done, including to mitigate defects.

Figure 11:
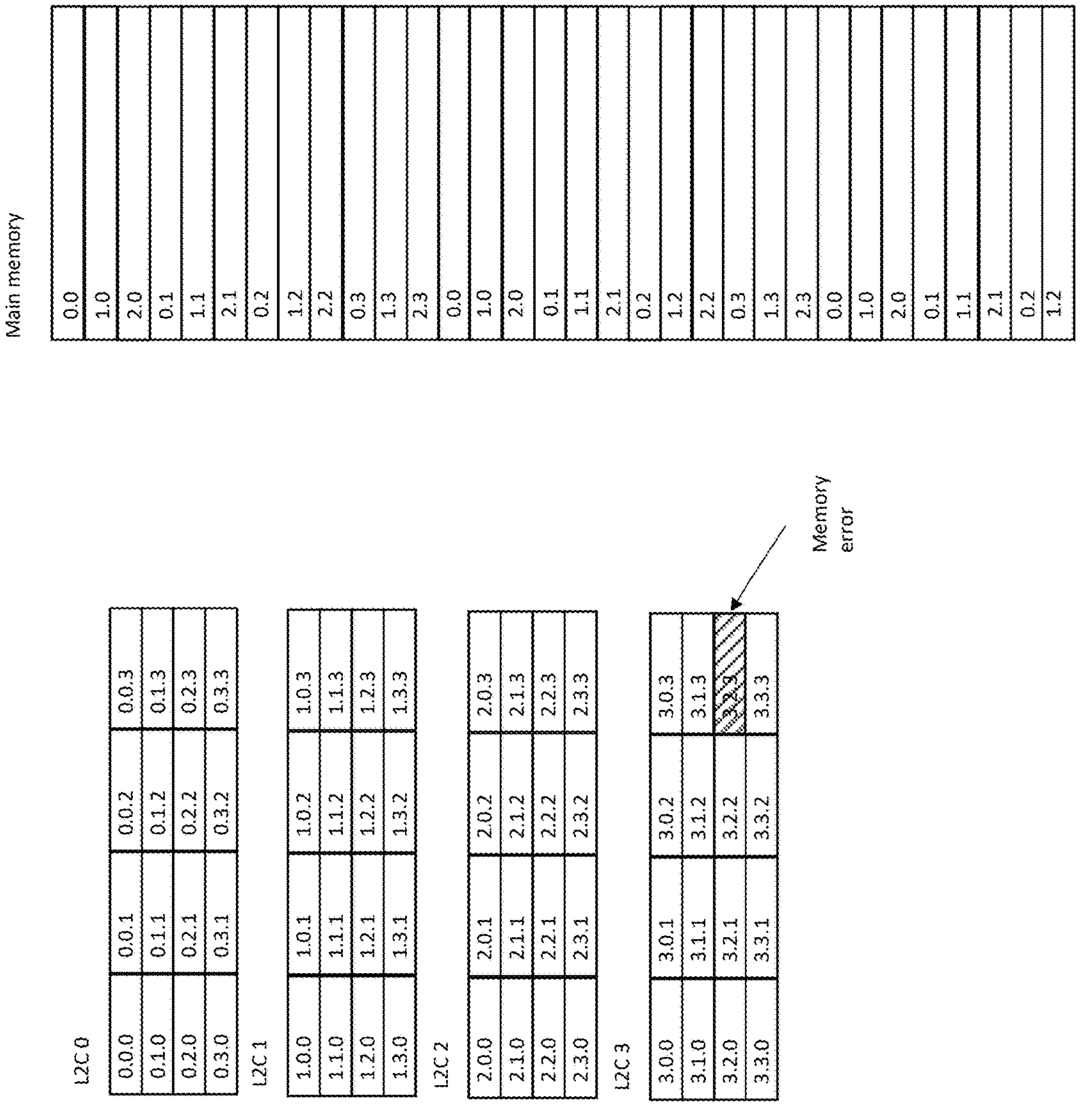
FIG. 11 shows an example of a memory defect.
Figure 12:
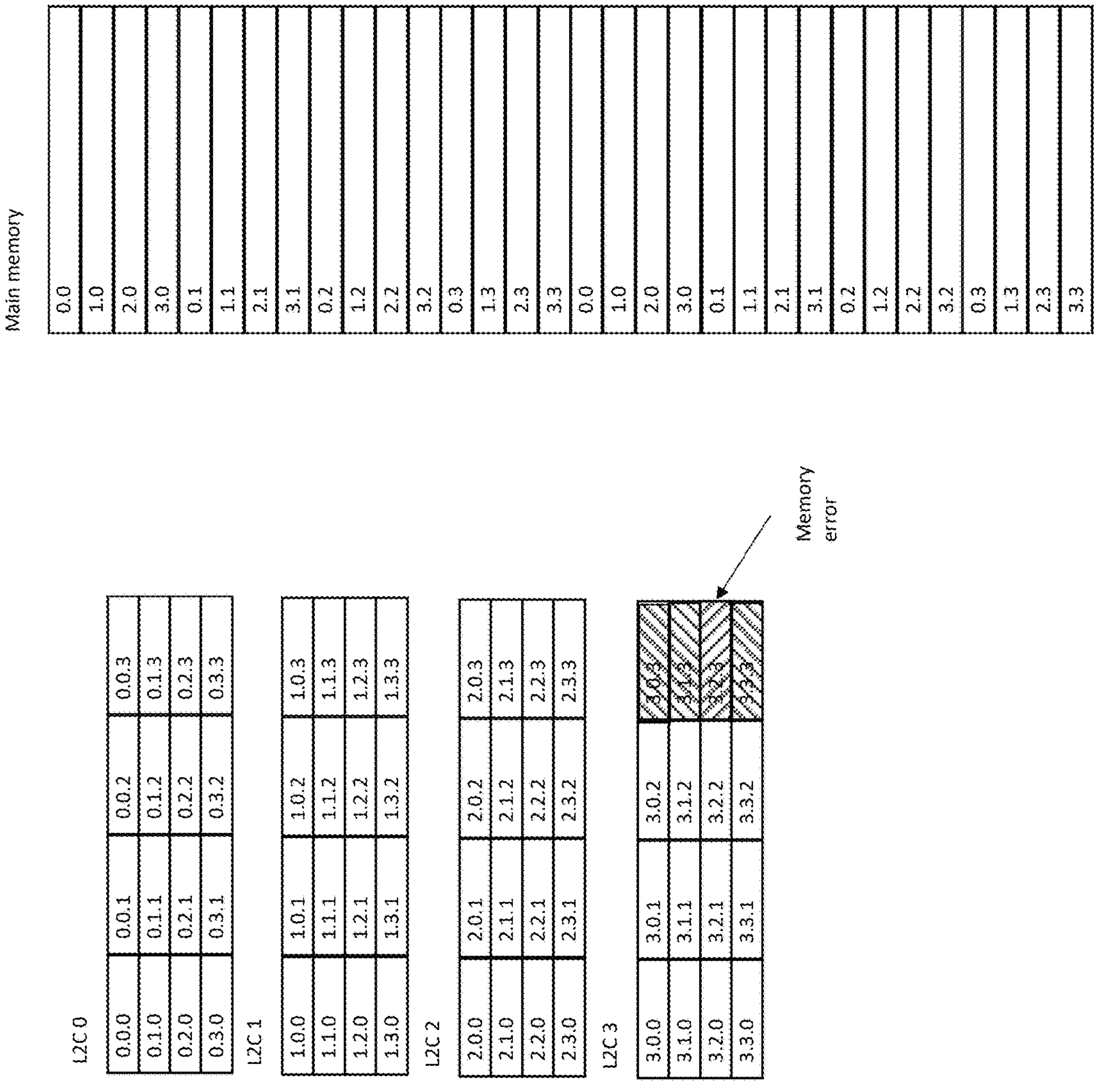
FIG. 12 shows another example of a memory defect.

For example, FIG. 11 illustrates a situation where there is a memory error defect affecting a particular one of the L2 cache slices. In particular, in this example, there is a failure in L2C slice 3, way 3. This could be managed therefore be completely disabling L2C slice 3, which would reduce the amount of cache to 3×64 KB=192 KB. Alternatively, as shown in FIG. 12, this memory error defect could be managed by disabling only the particular way that is affected (i.e. L2C slice 3, way 3). This would then result in a total of 3×64 KB+3/4*64 KB=240 KB of cache. However, for L2C slice 3, there are now only three ways, and this may result in increased conflict misses for these lines.

Figure 13:
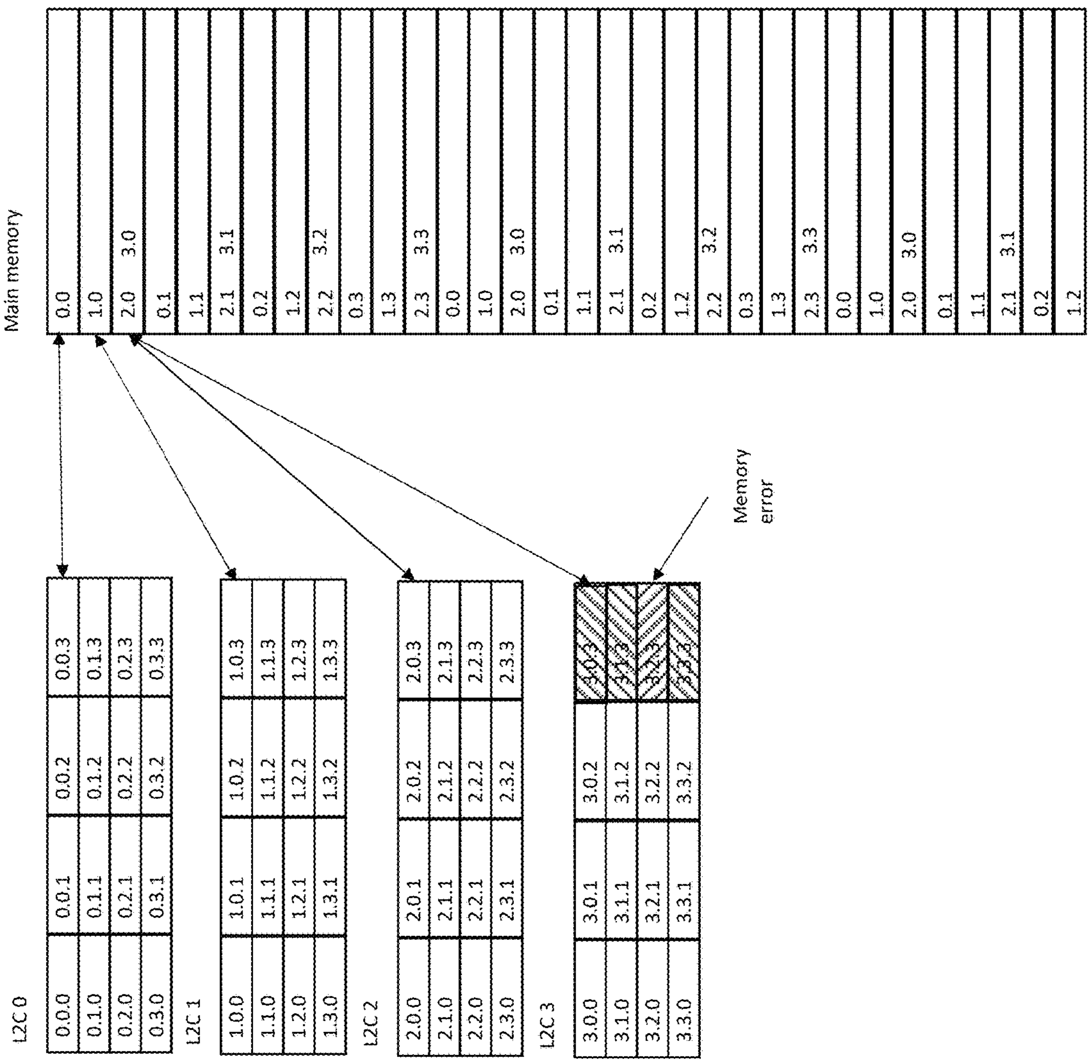
FIG. 13 shows how these memory defects can be mitigated according to an embodiment.

In embodiments, therefore, the address mapping (hash) may be changed to reduce the conflict miss issue. For instance, as shown in FIG. 13, multiple L2 cache slices (here 'L2C 2' and 'L2C 3') are mapped to the same memory address line, thus increasing the number of cache ways to seven.

Figure 14:
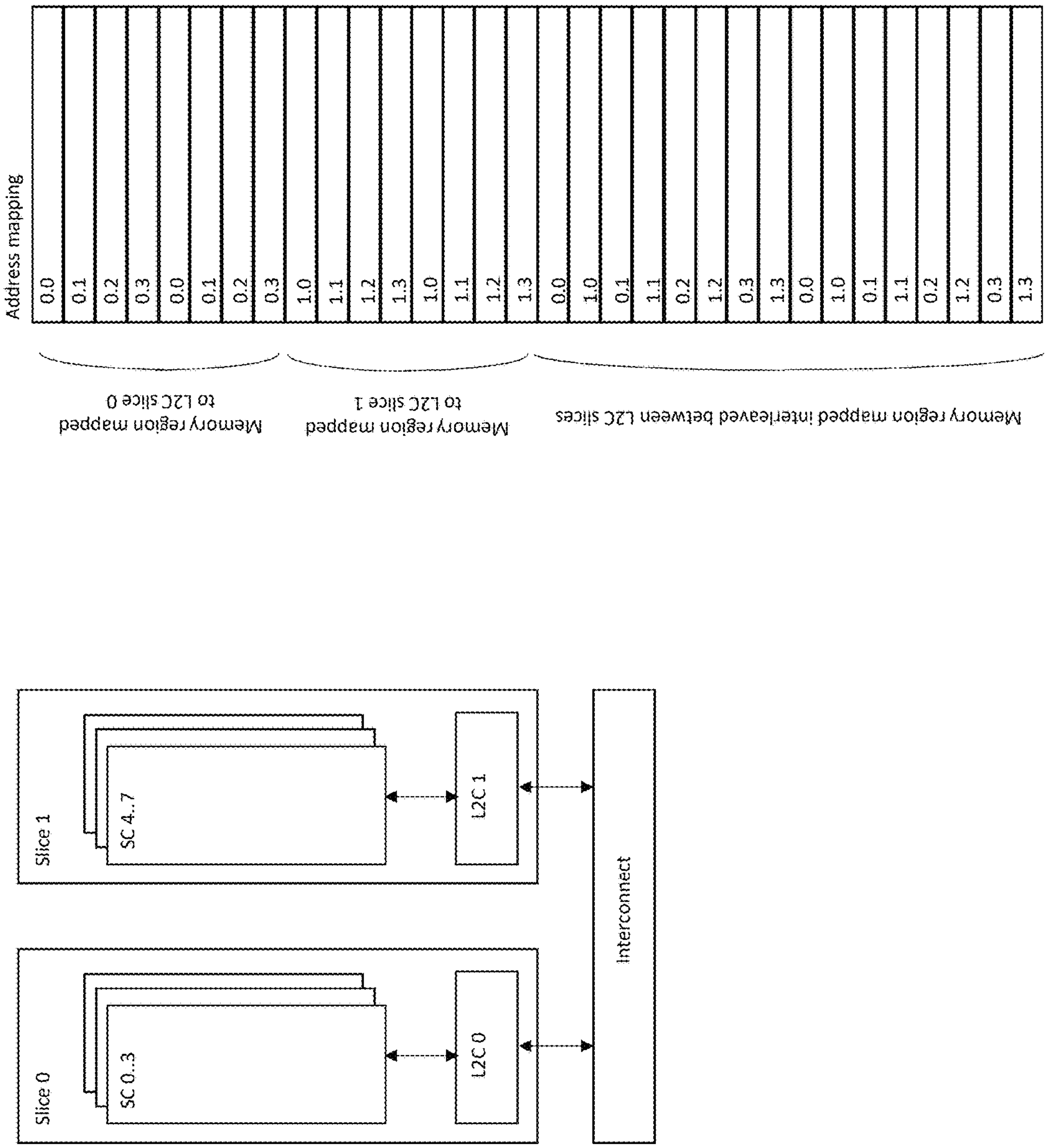
FIG. 14 shows another example memory address mapping that may be used within a graphics processor.

As another example, the mapping may be changed based on the processing workload that is being performed, e.g. to try to increase cache locality. For instance, referring to FIG. 14, where a memory region address space is likely to be used by L2C slice 0, and another memory region likely to be used by L2C slice 1, and a third memory region likely to be used by both L2C slice 0 and L2C slice 1, the mapping may be set to partition the memory address space to try to increase cache "locality", e.g. so that at least some memory accesses are preferentially issued to whichever L2C slice is physically closer to the shader core from which the memory access originates, thereby potentially reducing energy consumption and latency. In that case, the function used to perform the mapping may therefore take into account which shader core 202 (or graphics processing slice 200) the memory access originated from.

Thus, in embodiments, there is a programmable hash function that can be used to configure the address mapping, and re-configure the address mapping over time, in order to allow the cache resource to be flexibly managed and partitioned based on the processing requirements of the graphics processor.

Figure 15:
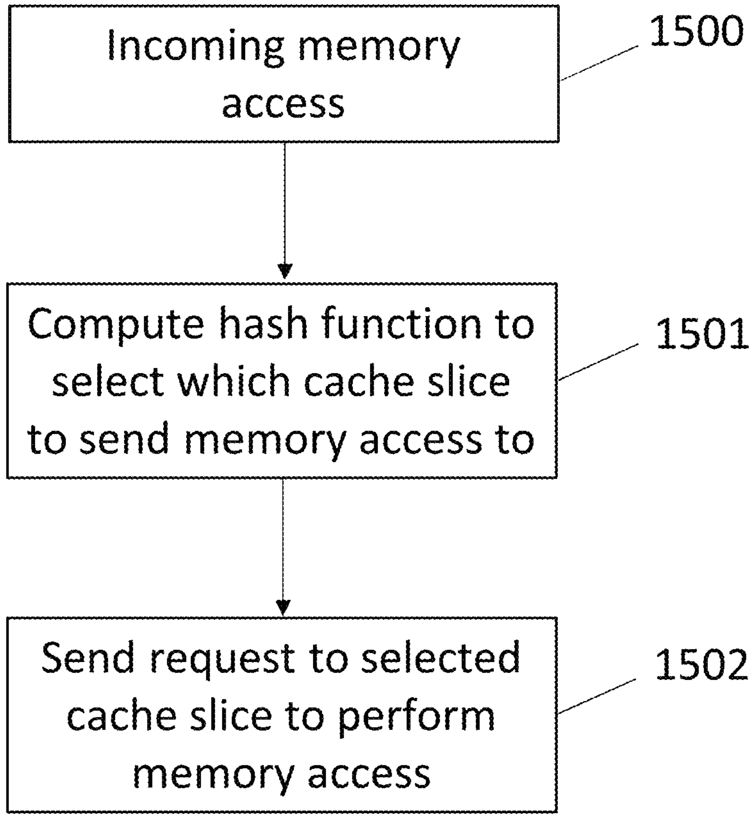
FIG. 15 is a flow chart illustrating a memory access operation according to an embodiment in which a set of cache slices are mapped to different memory address regions.

FIG. 15 is a flow chart showing an address mapping operation that may be performed by the memory access logic according to an embodiment where there are plural L2 cache slices, and each L2 cache slice is allocated to a different memory address region.

As shown in FIG. 15, in response to an incoming memory access (step 1500), a suitable hash function is computed for the incoming memory access to determine to which L2 cache slice the memory access should be sent (step 1501). For example, and in embodiments, the hash function is computed based on part of the memory address to which the memory access relates.

A request to perform the memory access is accordingly then sent to the selected L2 cache slice (step 1502). Thus, if it is determined based on the hash function that the memory access request is for L2C slice 0, the request is accordingly sent to L2C slice 0, and so on. The memory access can then be performed accordingly using the selected L2 cache slice, e.g. in the normal manner for performing cache accesses. In this way, memory traffic can be distributed between the plural L2 cache slices.

As mentioned above, however, in some situations, it may be desired to map multiple L2 cache slices to a single, same memory region.

Figure 16:
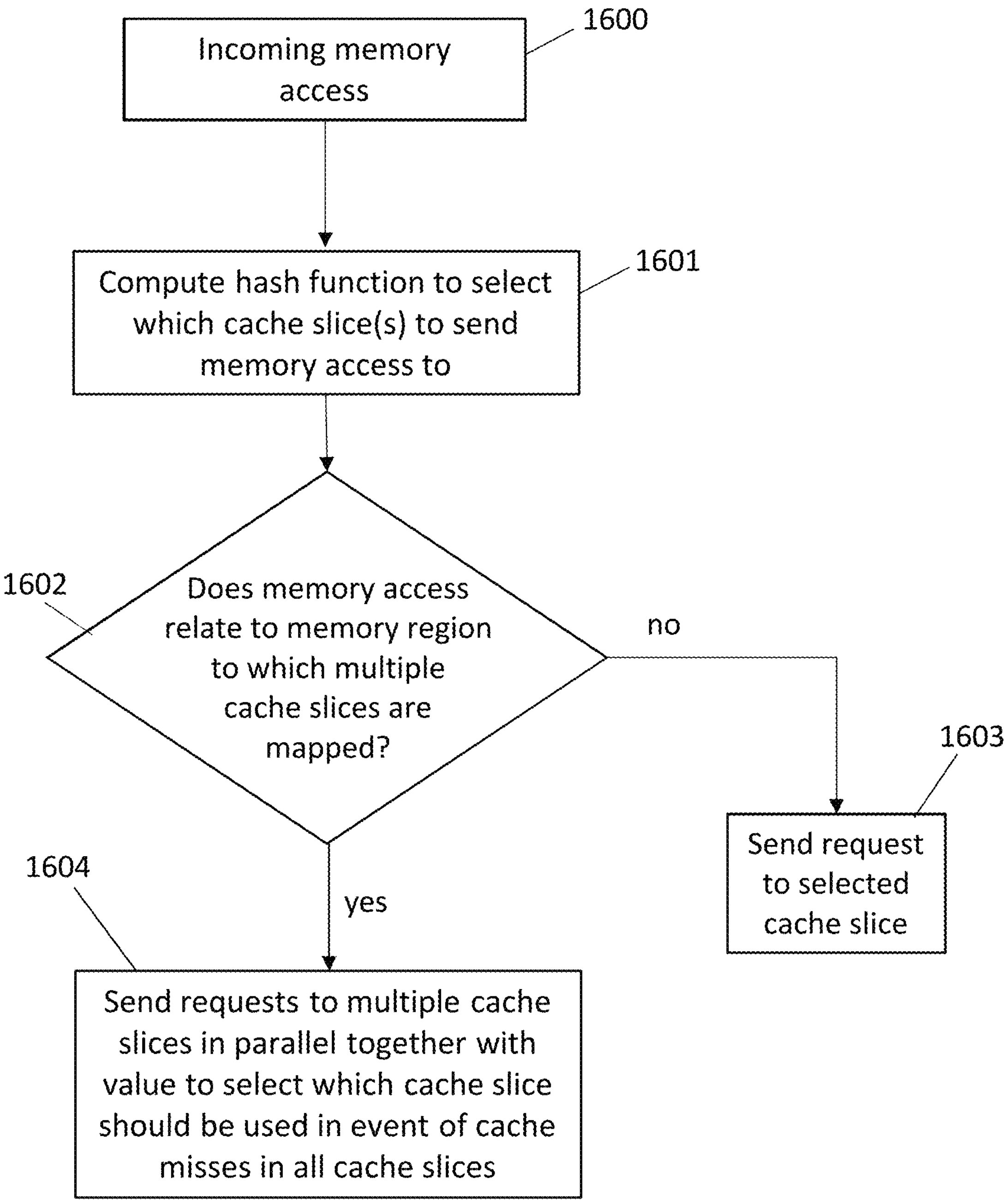
FIG. 16 is a flow chart illustrating a corresponding memory access operation in the case that multiple cache slices are mapped to a single, same memory address region.

FIG. 16 is a corresponding flow chart showing an address mapping operation that may be performed by the memory access logic according to an embodiment in a situation where multiple L2 cache slices are mapped to a single, same memory region.

As shown in FIG. 16, in response to an incoming memory access (step 1600), a suitable hash function is computed for the incoming memory access to determine to which L2 cache slice the memory access should be sent (step 1601), as above. In this situation, however, it is then checked whether the request relates to a memory address region to which multiple L2 cache slices are mapped. If the request relates to a memory address region to which multiple L2 cache slices are mapped (step 1602—yes), requests should be sent in parallel to each of those multiple L2 cache slices to perform the memory access (step 1604). At the same time, respective different values are sent with these requests to each of the multiple L2 cache slices, which values are used to select which of the multiple L2 cache slices is to be used in the event of a cache "miss" in all of the cache slices, as will be explained further below in relation to FIG. 17.

On the other hand, if the request does not relate to a memory address region to which multiple L2 cache slices are mapped (step 1602—no), i.e. there is only a single L2 cache slice mapped to the memory address region associated with the request, a suitable (single) request can be (and is) sent to the selected cache slice (step 1603), similarly as in the case illustrated in FIG. 15.

Figure 17:
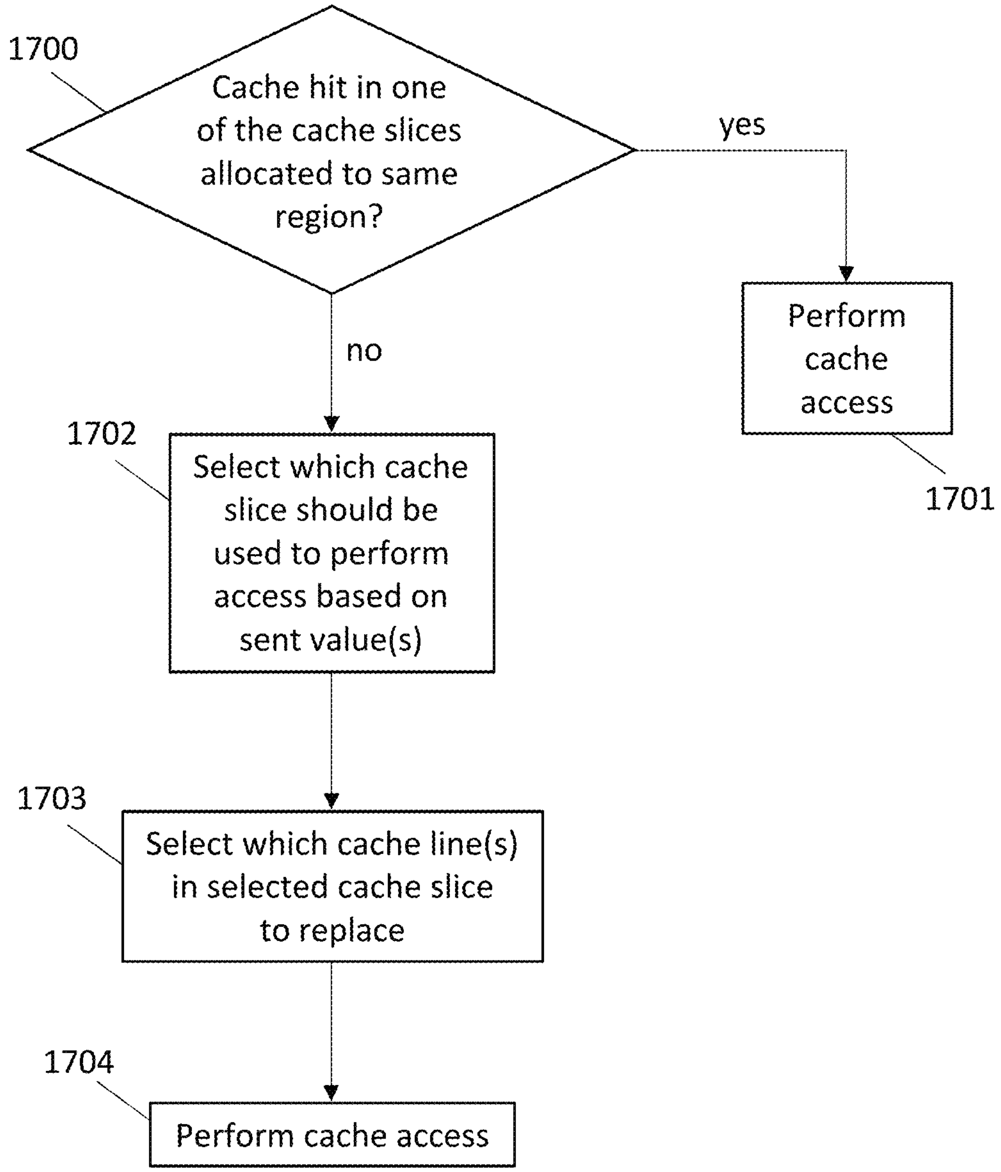
FIG. 17 is a flow chart illustrating further details of the cache operation in the situation shown in FIG. 16.

FIG. 17 shows in more detail the cache operations in response to a memory access according to the situation in FIG. 16 wherein the memory access relates to a memory address region to which multiple L2 cache slices have been mapped, e.g. the operations following step 1604 in FIG. 16.

For instance, as shown in FIG. 17, in this situation, it is first checked whether there is a cache "hit" for the relevant data in any of the multiple L2 cache slices to which the memory access request has been sent. If the relevant data is already present in the cache (step 1700—yes), i.e. there is a cache "hit", the cache access is performed accordingly (step 1701).

On the other hand, if the relevant data is not already present in any of the multiple L2 cache slices to which the memory access request has been sent (step 1700—no), i.e. there is a cache "miss" in each/all of the multiple L2 cache slices, the access logic in embodiments then selects which one of the multiple L2 cache slices should be used to perform the memory access (step 1702). To do this, a suitable tiebreaking mechanism is implemented based on the values that were sent with the requests (i.e. the values that were sent in step 1604 in FIG. 16).

In particular, in step 1604 in FIG. 16, different values are sent to different ones of the multiple L2 cache slices, and there will be a single one of these values which is sent to a respective single one of the multiple L2 cache slices that is used to indicate that it is that L2 cache slice that should be used to perform the memory access. Which value is sent to which L2 cache slice in step 1604 of FIG. 16 can be determined according to any suitable cache slice selection/replacement policy. In embodiments, this is selected randomly.

For example, in step 1604 in FIG. 16, in the present embodiments, a respective random number may be generated to select which L2 cache slice should be used to perform the memory access in the event that there is a cache miss in all of the multiple L2 cache slices. This random number may for example be generated using a Linear Feedback Shift Register (LFSR) and is generated so as to identify a particular one of the L2 cache slices that should be used. Thus, if there are four L2 cache slices, numbered from 0 to 3, a random number 0, 1, 2 or 3 (2'b00, 2'b01, 2'b10 or 2'b11) may be generated to identify which of the four L2 cache slices should be selected. For example, if the generated random number is 2'b11 (i.e. '3') this indicates that the L2 cache slice numbered '3' should be selected. A suitable first value, i.e. '1', may be sent to the L2 cache slice numbered '3' to indicate that it is that particular L2 cache slice that should perform the cache access (e.g. linefill) in the event that there is a cache miss in each/all of the multiple L2 cache slices. A different value, i.e. a '0' may then be sent to the other cache slices, to indicate that they should not perform the cache miss operation.

Thus, in this example whichever of the L2 cache slices is sent the first value, i.e. the '1', is the L2 cache slice that is then selected, in step 1702 of FIG. 17, to perform the cache access (e.g. linefill) in the event that there is a cache miss in each/all of the multiple L2 cache slices.

For whichever L2 cache slice is selected, it is then selected which cache line (or lines) should be replaced in order to process the cache "miss" (step 1703). This can be done based on any suitable cache eviction policy, but in one example this is done based on a least recently used (LRU) cache algorithm. The cache access is then performed accordingly, e.g. using the cache "miss" protocol, using the selected cache line(s) in the selected cache slice (step 1704).

It will be appreciated that the above mechanisms may be used for any suitable memory accesses that are issued via the L2 cache, as desired. Thus, in embodiments, both read and write memory accesses are handled according to the operations described above. Thus, in the case where multiple L2 cache slices are allocated to a single, same memory address region, in response to a memory access to that memory address region, a request is in embodiments sent to each of the multiple L2 cache slices in parallel, and a tiebreaking mechanism like that described above in relation to FIG. 16 and FIG. 17 is used to select which cache slice should be allocated for the memory access, and this is done both for read and write accesses. This will be particularly appropriate for read and write allocable caches, in which case a cache line will need to be allocated/evicted in the event that there is a cache "miss" either on a read or a write. In general, however, different schemes could be used depending on the particular cache implementation. For example, in some cases, e.g. if the cache is read allocable only, cache lines may only need to be allocated/evicted in the event that there is a cache "miss" on a read transaction, whereas write transactions may be written straight to memory in that event.

Various other arrangements would be possible.

It will be appreciated from the above that the technology described herein, at least in embodiments, allows more flexible graphics processor configuration and a more dynamic distribution of memory traffic between available cache "slices".

Figure 18:
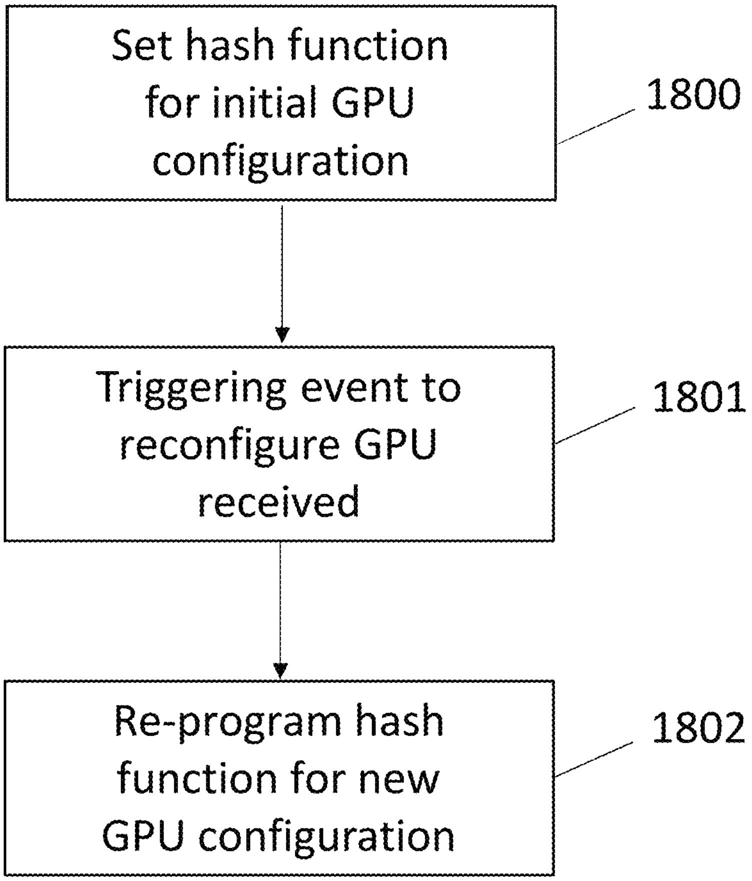
FIG. 18 is a flow chart illustrating a reprogramming of the function that is used to distribute memory traffic based on the graphics processor configuration.

For instance, as shown in FIG. 18, an appropriate hash function may be set for an initial configuration of the graphics processor (graphics processing unit) (GPU) 101 (step 1800). At some point, during use, a triggering event to reconfigure the graphics processor (graphics processing unit) (GPU) 101 may be received (step 1801). For example, this may be based on dynamic cache performance monitoring, or identification that there is a fault affecting some or all of the cache, but could also be externally triggered, e.g. to increase cache resource available for a particular partition or processing task. The graphics processor (graphics processing unit) (GPU) 101 may thus be reconfigured appropriately, and the hash function reprogrammed at this point for the new configuration (step 1802). Subsequent memory accesses will then be distributed according to the new hash function.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein described herein, in various embodiments and with various modifications as are suited to the particular use contemplated. It is intended that the scope be defined by the claims appended hereto.

The invention claimed is:

1. A graphics processor that comprises:

a plurality of processing cores;

a cache that is operable to transfer data between the processing cores and a memory that the graphics processor has access to, the cache arranged as plural cache slices, each cache slice corresponding to a separate portion of the cache; and an access logic circuit configured to control how memory accesses issued by the processing cores are distributed across the cache slices, wherein the cache slice that is used for a memory access is determined using a function computed by the access logic circuit based on one or more properties associated with the memory access, wherein the function that is used by the access logic circuit to determine which cache slice should be used for a memory access is programmable, such that the function can be changed over time to vary how memory accesses from the plurality of processing cores are distributed across the plural cache slices, and wherein the cache is an N-way, set associative cache, and the function is set to map multiple cache slices to a single, same memory address range to thereby increase the number of cache ways.

2. The graphics processor of claim 1, wherein the plurality of processing cores are configurable as one or more respective partitions of the processing cores within the graphics processor, with respective cache slices being allocated to respective partitions of processing cores for use thereby, and wherein the function that is used by the access logic circuit to determine which cache slice should be used for a memory access is programmable on a per-partition basis.

3. The graphics processor of claim 2, wherein different numbers of cache slices can be allocated to different partitions of processing cores, and wherein when the graphics processor is partitioned into one or more respective partitions of the processing cores, the function that is used by the access logic circuit to determine which cache slice should be used for a memory access for a particular partition is set based on the number of cache slices allocated to that partition to distribute memory accesses across the cache slices allocated to that partition.

4. The graphics processor of claim 1, wherein the access logic circuit is configured to implement a tiebreaking mechanism to select which of the multiple cache slices allocated to a particular, same memory address range should be used in the event that a memory access to that particular memory address range results in a cache miss in each of the multiple cache slices mapped to the memory address range.

5. The graphics processor of claim 4, wherein when issuing a memory access to the cache, when the memory address associated with the memory access is mapped to multiple cache slices, the memory access is issued to each of the multiple cache slices in parallel, and the access logic circuit is operable and configured to also send to the multiple cache slices a respective value that can be used to select which of the multiple cache slices allocated to a particular, same memory address range should be used in the event that a memory access to that particular memory address range results in a cache miss in each of the multiple cache slices mapped to the memory address range.

6. The graphics processor of claim 1, further comprising a scheduling unit that is operable to provide a respective virtual machine interface of the graphics processor and that is operable to receive processing jobs from a respective virtual machine and schedule corresponding processing tasks to processing cores within the graphics processor, wherein the scheduling unit is operable and configured to program the function that is used by the access logic circuit to determine which cache slice should be used for a memory access.

7. The graphics processor of claim 6, wherein the function that is used by the access logic circuit to determine which cache slice should be used for a memory access is programmable on a per-processing task basis so that memory accesses from the plurality of processing cores can be distributed across the plural cache slices differently for different processing tasks.

8. The graphics processor of claim 1, further comprising one or more cache monitoring circuits for monitoring the performance of the plural cache slices, and wherein the graphics processor is operable and configured to program the function that is used by the access logic circuit to determine which cache slice should be used for a memory access based on a result of the monitoring the performance of the plural cache slices.

9. A method of operating a graphics processor that comprises:

a plurality of processing cores; and a cache that is operable to transfer data between the processing cores and a memory that the graphics processor has access to, the cache arranged as plural cache slices, wherein each cache slice corresponds to a separate portion of the cache, and wherein the cache slice that is used for a memory access is determined using a function computed based on one or more properties associated with the memory access, and the method comprising:

re-programming the function that is used to determine which cache slice should be used for a memory access over time to vary how memory accesses from the plurality of processing cores are distributed across the plural cache slices, wherein re-programming the function comprises setting the function so as to map multiple cache slices to a single, same memory address range, wherein the cache is an N-way, set associative cache, and wherein the function is set to map multiple cache slices to a single, same memory address range to thereby increase the number of cache ways.

10. The method of claim 9, wherein the plurality of processing cores are configurable as one or more respective partitions of the processing cores within the graphics processor, with respective cache slices being allocated to respective partitions of processing cores for use thereby, and wherein the function that is used to determine which cache slice should be used for a memory access is programmable on a per-partition basis, the method comprising:

setting a first function for a first configuration of the plurality of processing cores into respective partitions of processing cores; and subsequently setting a second, different function for a second, different configuration of the plurality of processing cores into respective partitions of processing cores.

11. The method of claim 10, comprising setting the function that is used to determine which cache slice should be used for a memory access for a particular partition based on the number of cache slices allocated to that partition to distribute memory accesses across the cache slices allocated to that partition.

12. The method of claim 9, further comprising:

in the event that a memory access to a particular memory address range to which multiple cache slices have been mapped results in a cache miss in each of the multiple cache slices that has been mapped to the memory address range:

implementing a tiebreaking mechanism to select which of the multiple cache slices allocated to the particular memory address range should be used to perform the memory access.

13. The method of claim 12, the memory access is issued to each of the multiple cache slices in parallel, and the method comprises also sending to each of the multiple cache slices a respective value that can be used to select which of the multiple cache slices should be used.

14. The method of claim 9, wherein the graphics processor further comprises a scheduling unit that is operable to provide a respective virtual machine interface of the graphics processor and that is operable to receive processing jobs from a respective virtual machine and schedule corresponding processing tasks to processing cores within the graphics processor, wherein the programming of the function that is used to determine which cache slice should be used for a memory access is performed by the scheduling unit.

15. The method of claim 14, comprising re-programming the function that is used to determine which cache slice should be used for a memory access on a per-processing task basis so that memory accesses from the plurality of processing cores can be distributed across the plural cache slices differently for different processing tasks.

16. The method of claim 9, comprising monitoring the performance of the plural cache slices and re-programming the function that is used to determine which cache slice should be used for a memory access based on a result of the monitoring the performance of the plural cache slices.

17. A graphics processor that comprises:

a plurality of processing cores;

a cache that is operable to transfer data between the processing cores and a memory that the graphics processor has access to, the cache arranged as plural cache slices, each cache slice corresponding to a separate portion of the cache; and an access logic circuit configured to control how memory accesses issued by the processing cores are distributed across the cache slices, wherein the cache slice that is used for a memory access is determined using a function computed by the access logic circuit based on one or more properties associated with the memory access, wherein the function that is used by the access logic circuit to determine which cache slice should be used for a memory access is programmable, such that the function can be changed over time to vary how memory accesses from the plurality of processing cores are distributed across the plural cache slices, and the function can be set so as to map multiple cache slices to a single, same memory address range, and wherein when the function is set so as to map multiple cache slices to a single, same memory address range, the access logic circuit is configured to implement a tiebreaking mechanism to select which of the multiple cache slices allocated to a particular, same memory address range should be used in the event that a memory access to that particular memory address range results in a cache miss in each of the multiple cache slices mapped to the memory address range.

* * * * *